(12) United States Patent
Ayrapetyan et al.

(10) Patent No.: US 11,573,907 B2
(45) Date of Patent: Feb. 7, 2023

(54) CONTROLLING MEMORY ACCESSES USING A TAG-GUARDED MEMORY ACCESS OPERATION

(71) Applicant: Arm Limited, Cambridge (GB)

(72) Inventors: Ruben Borisovich Ayrapetyan, Cambridge (GB); Graeme Peter Barnes, Cambridge (GB); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 45 days.

(21) Appl. No.: 17/269,388

(22) PCT Filed: Oct. 21, 2019

(86) PCT No.: PCT/GB2019/052998
§ 371 (c)(1),
(2) Date: Feb. 18, 2021

(87) PCT Pub. No.: WO2020/099825
PCT Pub. Date: May 22, 2020

(65) Prior Publication Data
US 2021/0326268 A1    Oct. 21, 2021

(30) Foreign Application Priority Data

Nov. 14, 2018  (GB) ..................... 1818572

(51) Int. Cl.
*G06F 12/1027* (2016.01)
*G06F 12/14* (2006.01)

(52) U.S. Cl.
CPC ...... *G06F 12/1027* (2013.01); *G06F 12/1475* (2013.01); *G06F 2212/1052* (2013.01); *G06F 2212/68* (2013.01)

(58) Field of Classification Search
CPC ............. G06F 12/1027; G06F 12/1475; G06F 2212/1052; G06F 2212/68; G06F 12/1416; G06F 2212/1016
See application file for complete search history.

(56) References Cited

U.S. PATENT DOCUMENTS

2002/0191467 A1\* 12/2002 Matsumoto ........... G11C 11/406
365/222
2007/0283115 A1   12/2007 Freeman et al.
(Continued)

FOREIGN PATENT DOCUMENTS

| EP | 2 743 834 | 6/2014 |
|---|---|---|
| GB | 2570691 | 8/2019 |
| GB | 2570692 | 8/2019 |

OTHER PUBLICATIONS

International Search Report and Written Opinion of the ISA for PCT/GB2019/052998 dated Jan. 27, 2020, 15 pages.
(Continued)

*Primary Examiner* — Michael Krofcheck
(74) *Attorney, Agent, or Firm* — Nixon & Vanderhye P.C.

(57) ABSTRACT

An apparatus and method are provided for controlling memory accesses. The apparatus has memory access circuitry for performing a tag-guarded memory access operation in response to a target address, the tag-guarded memory access operation by default comprising: comparing an address tag associated with the target address with a guard tag stored in a memory system in association with a block of one or more memory locations comprising an addressed location identified by the target address; and generating an indication of whether a match is detected between the guard tag and the address tag. Further, the apparatus has control tag storage for storing, for each of a plurality of memory regions, configuration control information used to control how the tag-guarded memory access operation is performed (Continued)

by the memory access circuitry when the target address is within that memory region. Each memory region corresponds to multiple of the blocks. This provides a very flexible and efficient mechanism for performing tag-guarded memory access operations.

27 Claims, 17 Drawing Sheets

(56) References Cited

U.S. PATENT DOCUMENTS

| | | |
|---|---|---|
| 2014/0181454 A1 | 6/2014 | Manula et al. |
| 2015/0317338 A1 | 11/2015 | Radovic et al. |
| 2016/0132271 A1* | 5/2016 | Takada .................. G06F 3/0604 711/154 |
| 2017/0024128 A1 | 1/2017 | Beale et al. |
| 2017/0153982 A1* | 6/2017 | Kapoor ............... G06F 12/1027 |
| 2017/0177429 A1 | 6/2017 | Stark et al. |
| 2019/0205261 A1* | 7/2019 | Cheriton ................... G06F 8/65 |
| 2020/0042725 A1* | 2/2020 | Bolkhovitin .......... H04L 67/108 |

OTHER PUBLICATIONS

Combined Search and Examination Report for GB1818572.8 dated May 1, 2019, 5 pages.

Robert Bedichek, "Some Efficient Architecture Simulation Techniques," Proceedings of the Winter 1990 USENIX Conference, Jan. 22-26, 1990, 12 pages.

Examination Report for GB Application No. 1818572,8 dated Mar. 15, 2021, 4 pages.

\* cited by examiner

CONTROLLING MEMORY ACCESSES USING A TAG-GUARDED MEMORY ACCESS OPERATION

This application is the U.S. national phase of International Application No. PCT/GB2019/052998 filed Oct. 21, 2019 which designated the U.S. and claims priority to GB Patent No. 1818572.8 filed Nov. 14, 2018, the entire contents of each of which are hereby incorporated by reference.

BACKGROUND

The present technique relates to the field of data processing.

Software to be executed by a data processing apparatus may typically be written in a high-level programing language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programing languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;
Use-after-free errors, in which an access to a memory location is made after that memory location has already be deallocated or freed;
Use-after-return, in which a memory access to an address associated with a variable used within a function (such as a value on a stack) is made after already returning from the function;
Use-out-of-scope errors, in which variables are accessed outside of the scope in which they are declared; and
Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

SUMMARY

In one example configuration, there is provided an apparatus comprising: memory access circuitry to perform a tag-guarded memory access operation in response to a target address, the tag-guarded memory access operation by default comprising: comparing an address tag associated with the target address with a guard tag stored in a memory system in association with a block of one or more memory locations comprising an addressed location identified by the target address; and generating an indication of whether a match is detected between the guard tag and the address tag; and control tag storage to store, for each of a plurality of memory regions, configuration control information used to control how the tag-guarded memory access operation is performed by the memory access circuitry when the target address is within that memory region, each memory region corresponding to multiple of the blocks.

In another example configuration, there is provided a method of controlling memory accesses comprising: performing a tag-guarded memory access operation in response to a target address, the tag-guarded memory access operation by default comprising: comparing an address tag associated with the target address with a guard tag stored in a memory system in association with a block of one or more memory locations comprising an addressed location identified by the target address; and generating an indication of whether a match is detected between the guard tag and the address tag; storing, for each of a plurality of memory regions, configuration control information; and using the configuration control information to control how the tag-guarded memory access operation is performed by the memory access circuitry when the target address is within that memory region, each memory region corresponding to at least one of the blocks.

In accordance with a still further example configuration, there is provided a computer program for controlling a host data processing apparatus to provide an instruction execution environment for execution of instructions of target program code, comprising: memory access program logic to perform a tag-guarded memory access operation in response to a target address, the tag-guarded memory access operation by default comprising: comparing an address tag associated with the target address with a guard tag stored in a memory system in association with a block of one or more memory locations comprising an addressed location identified by the target address; and generating an indication of whether a match is detected between the guard tag and the address tag; and a control tag data structure to store, for each of a plurality of memory regions, configuration control information used to control how the tag-guarded memory access operation is performed by the memory access program logic when the target address is within that memory region, each memory region corresponding to at least one of the blocks.

In a yet further example configuration, there is provided an apparatus comprising: memory access means for performing a tag-guarded memory access operation in response to a target address, the tag-guarded memory access operation by default comprising: comparing an address tag associated with the target address with a guard tag stored in a memory system in association with a block of one or more memory locations comprising an addressed location identified by the target address; and generating an indication of whether a match is detected between the guard tag and the address tag; and control tag storage means for storing, for each of a plurality of memory regions, configuration control information used to control how the tag-guarded memory access operation is performed by the memory access means when the target address is within that memory region, each memory region corresponding to multiple of the blocks.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
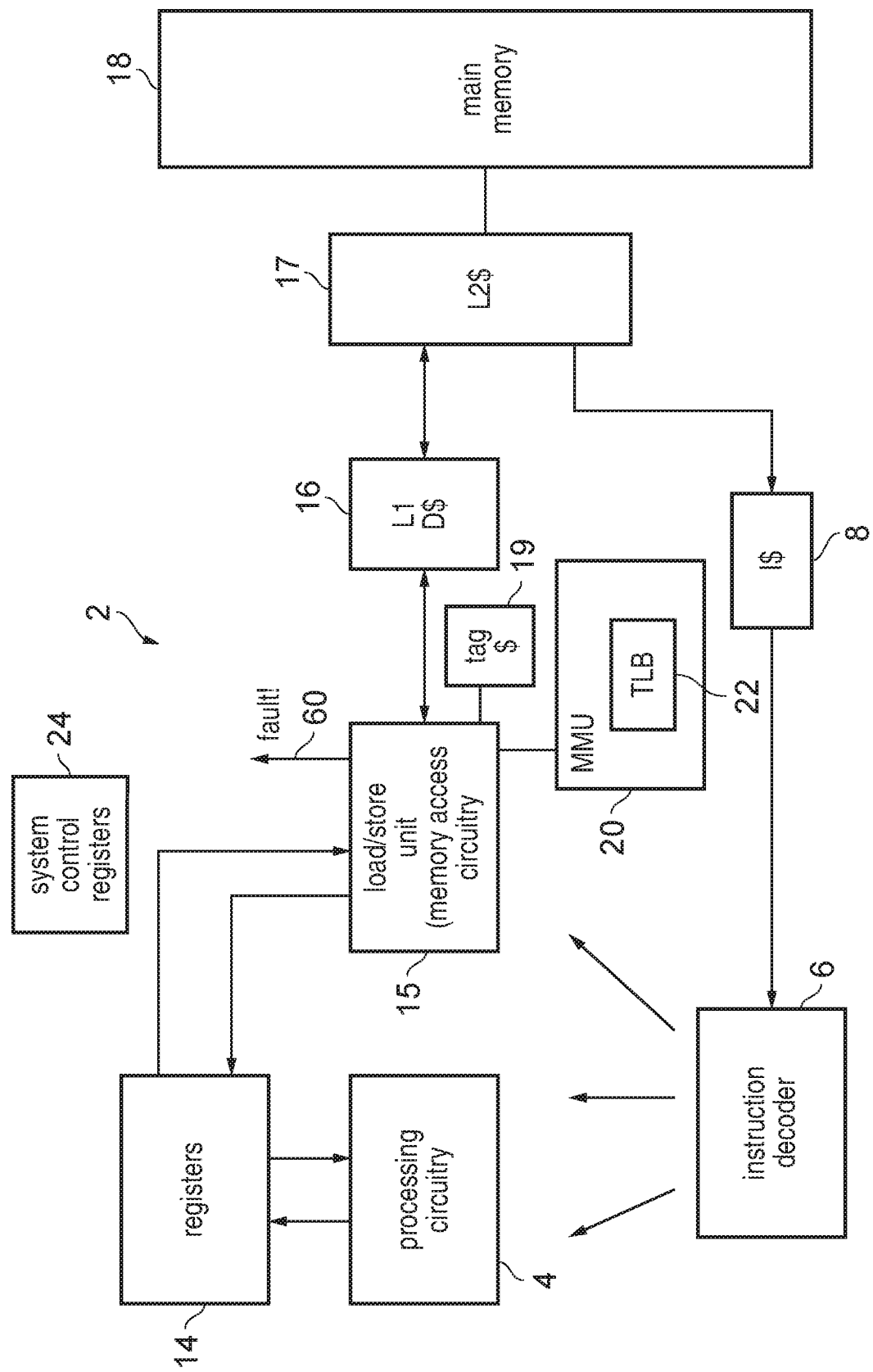
FIG. 1 schematically illustrates an example of a data processing apparatus.

One approach for protecting against certain memory usage errors of the type discussed above may be to provide guard tags which are stored in a memory system in association with blocks of one or more memory locations. When a tag-guarded memory access operation is requested based on a target address identifying a particular addressed location in the memory system, memory access circuitry may compare an address tag that is associated with the target address with a guard tag that is stored in the memory system in association with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

However, it would be desirable to provide a more flexible and efficient mechanism for performing tag-guarded memory access operations.

In accordance with the techniques described herein, the data processing apparatus is provided with control tag storage that is arranged to store, for each of a plurality of memory regions, configuration control information used to control how the tag-guarded memory access operation is performed by the memory access circuitry when the target address is within that memory region. Each memory region is arranged to correspond to multiple of the blocks. Hence, in accordance with the techniques described herein, the manner in which the tag-guarded memory access operation is performed can be controlled in dependence on the memory region currently being accessed. This provides a great deal of flexibility, since individual memory regions can be treated differently. The approach can also enable significant efficiency benefits, since as will be discussed in more detail later it can avoid the need to access or update the individual guard tags associated with the blocks in certain memory regions, whilst still enabling a desired form of tag-guarded memory access operation to be performed in respect of that memory region.

Each memory region can take a variety of forms, but in one example implementation each memory region comprises one or more memory pages. In particular, it will be understood that the memory address space is typically partitioned into physical pages, and each memory region to which the configuration control information is provided can correspond to one or more of those physical pages. Within a system that employs virtual to physical address translation, it will be understood that virtual pages may also be defined, the translation information necessary to enable virtual addresses within the virtual page to be translated into physical addresses being obtained from one or more associated page tables in memory. In accordance with the techniques described herein, the one or more memory pages that form each memory region may be physical pages, or may alternatively be virtual pages.

Whilst in one implementation each memory region may comprise more than one memory page, in one specific implementation each memory region comprises a single memory page. It has been found that this provides a particularly efficient form for use of the techniques described herein, since it provides control of tag-guarded memory access operations on a page-by-page basis, and also enables the associated configuration control information to be managed and accessed efficiently. For example, it is often the case that one or more caching structures may be provided within the apparatus for maintaining information that relates to individual memory pages. For instance, a translation lookaside buffer (TLB) may be used for storing address translation data related to a particular memory page. Since the configuration control information is also provided on a page-by-page basis in implementations where the memory regions comprise single memory pages, then that configuration control information can also readily be cached within the apparatus, for example by making use of existing caching structures.

The configuration control information can take a variety of forms. In one example the configuration control information comprises a same tag mode field and a memory region guard tag. The memory access circuitry may then be arranged, when the addressed location identified by the target address is within a memory region whose same tag mode field is set, to modify the tag-guarded memory access operation such that the address tag is compared with the memory region guard tag for that memory region instead of with the guard tag associated with the block containing the addressed location. Such an approach can provide significant performance/efficiency gains. For example, in situations where it is considered appropriate to have the same guard tag value for all of the blocks within a particular memory region, the need to set those individual guard tag values can be avoided, by instead setting the same tag mode field within the configuration control information, and storing the desired guard tag information as a memory region guard tag within the configuration control information. Whilst the same tag mode field is set, then any tag guarded memory access operations performed in relation to blocks of memory locations within the memory region will be performed using the single memory region guard tag stored as the configuration control information for that memory region, instead of using individual guard tags associated with each block.

In addition to the performance/efficiency benefits that can be realised by not needing to maintain individual guard tags for the blocks within a memory region whose same tag mode field is set in the corresponding configuration control information, this approach can also enable the check performed during any individual tag guarded memory access operation to be performed more quickly. In particular, it may be quicker to access the memory region guard tag than an individual guard tag for a block, due to the smaller number of memory region guard tags that will be present when compared with the number of individual block-based guard tags. This may particularly be the case if the memory region guard tag is cached within a caching structure of the apparatus, such as in a TLB.

The configuration control information need not only support a single mode such as the above described same tag mode, and alternatively, or in addition, different modes may also be identified by the configuration control information.

For instance, in one example arrangement the configuration control information may comprise a match all mode field. The memory access circuitry may then be arranged, when the addressed location identified by the target address is within a memory region whose match all mode field is set, to modify the tag-guarded memory access operation such that when the address tag has a predetermined value, the comparison of the address tag with the guard tag is bypassed, and the generating step comprises generating an indication that a match is detected between the guard tag and the address tag. This can provide significant flexibility, whilst also ensuring full security of the tag-guarded memory access approach where needed. In particular, it means that the tag-guarded memory access approach can be used only in the memory regions where it is considered necessary, and other memory regions can effectively bypass the tag-guarded memory access control by setting the address tag to a predetermined value. This can be useful in a variety of situations. For example, some existing procedures may legitimately clear one or more upper bits of an address, which may for example include the address tag information. A particular example of this would be the use of compressed pointers. Accordingly, in such instances, it may be beneficial to set the match all mode field within a memory region where such activities are being performed, so that differences between the guard tag and the address tag are not flagged.

In one example arrangement, if the addressed location identified by the target address is within a memory region whose match all mode field is set, but the guard tag is other than the above mentioned predetermined value, then the normal tag-guarded memory access operation will be performed. The actual form of tag guarded memory access operation performed at that point will depend on other configuration information provided for the memory region. For example, if the same tag mode field is set, then the comparison of the address tag will be performed with reference to the memory region guard tag rather than the relevant guard tag for the associated block of memory locations.

Whilst the above described match all mode makes reference to the address tag having a predetermined value, in an alternative implementation it may be the guard tag that is set to the predetermined value, and accordingly the comparison of the address tag with the guard tag is bypassed if the guard tag has a predetermined value.

As another example of information that may be maintained as part of the configuration control information for a memory region, the configuration control information may comprise a precise tag check mode field. The memory access circuitry may then be arranged, when the addressed location identified by the target address is within a memory region whose precise tag check mode field is set, to perform the tag-guarded memory access operation such that when a mismatch is detected between the guard tag and the address tag the memory access circuitry is arranged to prevent a memory access to the addressed location being performed. Hence, in accordance with such an approach, when the precise tag check mode field is set, the check of the guard tag and the address tag is performed in synchronisation with the associated memory access, so that the memory access is stopped if there is a mismatch. The actions taken at that point can vary, but in one embodiment an exception can be raised to a higher exception level, where appropriate action can be taken.

Further, in one example arrangement, the memory access circuitry is arranged, when the addressed location identified by the target address is within a memory region whose precise tag mode field is unset, to perform the tag-guarded memory access operation such that when a mismatch is detected between the guard tag and the address tag the memory access circuitry is arranged to allow the memory access to the addressed location to be performed asynchronously to any mismatch indication raised in respect of the mismatch. Hence, in such an approach, the memory accesses are not delayed whilst the check is performed, and instead any mismatch indications are generated asynchronously to the memory accesses to indicate whether matches or mismatches occurred. It should be noted that whilst a separate mismatch indication may be generated each time a mismatch is detected, hence enabling direct identification of the memory access that failed the tag check, in other implementations a more generic indication may be issued, for example indicating that one or more accesses have failed the tag check, allowing an additional investigation to then be performed following that indication to ascertain more details about the memory accesses that failed.

It can be useful in some instances to not set the precise tag check mode for certain memory regions, in order to improve speed of data access (for example by disabling the precise tag check mode in respect of a memory page currently undertaking frequent accesses to data). However, since the configuration control information can be specified on a memory region by memory region basis, in one example implementation on a page-by-page basis, the described approach can increase security/debug ability by disabling the precise tag check mode only where necessary without needing to disable it for an entire process being performed by the apparatus.

The control tag storage can take a variety of forms. For example, it may be formed by part of the memory system with which the memory access circuitry is coupled. In some implementations the control tag storage may include a cache structure for caching the configuration control information for certain memory regions, so as to increase the speed of access to that configuration control information. When such a cache structure is used, the cache structure can take a variety of forms. For example, it could be a dedicated cache structure used to cache the configuration control information for one or more memory regions. Alternatively, it could be a cache structure that is also used to cache guard tags for individual blocks of memory locations.

In one example arrangement where each memory region comprises one or more memory pages, then a particularly efficient implementation of caching structure can be achieved by arranging for the control tag storage to include a translation lookaside buffer (TLB) having a plurality of entries. Each entry is used to maintain address translation information for a memory page, as per the standard behaviour of a TLB, but in this implementation each entry also includes a field used to identify the configuration control information for that memory page. The use of the TLB structure can provide a particularly elegant solution for caching configuration control information associated with memory pages, since the entries are already provided to maintain other information related to such memory pages.

In one example arrangement where each memory region comprises one or more physical pages, then the page table structure in memory does not need to be modified, and the address translation information for each entry is obtained in the standard manner. However, in addition, each TLB entry can be extended in order to provide the additional field used to identify the configuration control information, and a separate access can be performed to obtain the required item of configuration control information for the page in question (for example by reading that information from the memory system).

However, in an alternative embodiment, the configuration control information may be associated with virtual pages in memory, and in that instance it may be possible to supplement the page table information in memory so as to include the configuration control information. In that instance, the configuration control information will be retrieved and populated in the entry of the TLB as part of the page table walk process used to obtain the address translation information. In some such instances, for example in smaller systems where the overall memory address space is relatively small, there may be existing redundant space within the page tables that can be used to accommodate the configuration control information. In such implementations, a system register may be used to identify which bits of the address translation information retrieved from the page tables provides the configuration control information. This variation may be faster, because it does not need the additional lookup in order to load page tag information when a TLB entry is initially filled, since all of the information is retrieved directly as part of the page table walk process. Further, if the system page tables do not have enough space, then it may be possible and more efficient to put the page tag information in some extensions of page tables or similar structures, if available in the specific architecture under consideration.

In one example arrangement, the configuration control information for each memory region is maintained within a memory area of the memory system, and the apparatus further comprises an instruction decoder to decode configuration control information access instructions to control the memory access circuitry to load the configuration control information for a determined memory region from the memory area, and to store updated configuration control information for a determined memory region to the memory area. Whilst the general memory address space may be used for this purpose, and accordingly standard load or store instructions may be used to access the configuration control information, in one example arrangement the memory area is a dedicated area of the memory system that is provided specifically for storing the configuration control information. In such instances, the configuration control access instructions may be specific forms of load and store instructions provided for accessing that memory area. The system can then configure what rights to access that memory area are given to particular exception levels. For example, at the application/user level, the dedicated memory area may only be accessible using the specific load and store instructions provided for that purpose, whereas at kernel level there may be more freedom to access that dedicated memory area using other instructions.

In one example arrangement, the apparatus may further comprise control tag storage update circuitry responsive to a trigger to perform a refresh operation in respect of the configuration control information stored in the control tag storage. As mentioned earlier, the control tag storage may include one or more cache structures, and the use of the control tag storage update circuitry can be used to avoid that cached information becoming stale.

There are a number of ways in which the trigger to perform the refresh operation may occur. In one example arrangement the trigger occurs upon execution of a refresh instruction by the apparatus, the refresh instruction providing an address indication used to identify one or more memory regions whose configuration control information is to be subjected to the refresh operation. Hence, the address indication may specify a particular address, or a range of addresses, and based on that information the one or more memory regions whose configuration control information is to be subjected to the refresh operation can be determined.

The refresh instruction can take a variety of forms. In implementations where the configuration control information is cached within a TLB structure, the refresh instruction may be a TLB refresh configuration control information instruction, which on execution causes a maintenance operation to be performed within the TLB in order to identify which entries within the TLB provide configuration control information for a memory page identified by the address indication of the TLB refresh configuration control information instruction, and to perform a refresh action in respect of the configuration control information in each identified entry.

The refresh action performed can take a variety of forms, and may for example either involve invalidating the configuration control information as stored in an identified entry of the TLB, or updating that configuration control information by retrieving an up-to-date version of that information from the memory system.

Whilst in the above described example, the trigger occurs due to execution of a particular refresh instruction, the trigger could also occur due to other events. For example, the trigger may occur upon execution of a store instruction used to store updated configuration control information for a determined memory region to the memory system. In particular, on performing such a store, it is known that there is a potential that the cached information may now be stale, and accordingly a refresh operation could be triggered directly.

It should be noted that, irrespective of the trigger mechanism used, the refresh operation may only affect the contents of the TLB entry that maintain the configuration control information, and the other contents of the TLB entries, namely the address translation information and associated attribute information, will not in one example implementation be changed in response to the above described refresh operation. However, entire TLB entries could still be invalidated using already existing TLB invalidate operations.

In one example implementation, a system control register can be used to control which operating modes of the apparatus are enabled to perform the refresh operation. For example, the system control register may identify an extent to which the refresh operation is allowed to be performed whilst the apparatus is operating at an application level (sometimes also referred to as a user level).

The system control register information can take a variety of forms. For example, that information may be used to select between a number of different modes. For example, one mode may indicate that the refresh operation is not allowed to be performed in exception level 0, and instead any attempt to perform the refresh operation at exception level 0 should be trapped to exception level 1, i.e. an exception level associated with the operating system/kernel. Alternatively another mode may be specified that indicates that the refresh operation is allowed in exception level 0 for all pages. As another example, a mode may be specified that indicates that the refresh operation is allowed in exception level 0 for some pages depending on page attributes specified in the relevant page tables in memory. The relevant set of page attributes can then be defined by the architecture or implementation. In the absence of those page attributes being present, then again an attempt to perform the refresh operation may be trapped to exception level 1. Due to the ability to specify this type of information on a page-by-page basis, this can enable faster refresh operations to be performed in many situations, by avoiding the need to trap the refresh request to a higher exception level in some instances, while still maintaining security where need be to ensure that refresh is trapped to a higher exception level.

On the other hand, allowing such a refresh operation in user space may give rise to a mechanism for performing denial-of-service attacks from untrusted processes. For example, such an untrusted process may seek to perform refresh operations frequently within the exception level 0 user space, thereby slowing down the system. However, by trapping to a higher exception level, this can be used to manage such denial-of-service problems. Thus, in one example configuration the system control register may be set so as to seek to prevent, at the application level, denial of service attacks attempted using the refresh operation.

For example, by using the above type of configuration, the system control registers could be configured at exception level 1 so as to only allow refresh operations in exception level 0 for trusted processes, while disabling it for others. Another way to mitigate from such denial-of-service attacks could be to enable trapping to exception level 1 of a refresh operation after every N executions of the refresh operation, or if N or more executions of the refresh operation occur within a predetermined period of time. This would allow fast page tag refresh in most cases, whilst also providing a way for the kernel to control the frequency of refresh operation execution, and so prevent related denial-of-service attacks.

In implementations that use the earlier-discussed same tag mode, then the setting of the same tag mode can also be used to control other functionality over and above the earlier discussed tag-guarded memory access operation. In particular, the memory access circuitry may be responsive to a request to access a guard tag associated with a chosen block, to take an alternative action when the same tag mode field is set for the memory region associated with that chosen block. Such an access may be performed to seek to read a guard tag value, or to write an updated guard tag value. In each case, the alternative action performed when the same tag mode is set may differ. For example, the use of any instruction attempting to store a guard tag value for a block to memory, where that block is within a memory region whose same tag mode field is set, may cause an exception to be generated, whereby an exception handling routine can determine what steps to take with regards to that store request. As another example, use of any instruction that attempts to read a guard tag for a block from memory, where that block is within a memory region whose same tag mode is set, may cause the memory region guard tag to be returned instead of the block's guard tag.

In one example arrangement, the apparatus may be arranged, for a chosen memory region, to switch between a default mode where the same tag mode field for that chosen memory region is unset and a same tag mode where the same tag mode field for that chosen memory region is set, depending on a trigger condition. The switching function may be implemented by hardware or software, depending on the particular implementation.

The trigger condition can take a variety of forms. For example, such a scheme could be used in association with tagging of an area of memory that is used as a stack. For example, by default stack pages may have the same tag mode disabled. Tagging of small variables could always then be performed on the assumption that the same tag mode is disabled. However, large buffers could instead be tagged and untagged using an approach that enables same tag mode when tagging of such large buffers is considered efficient according to heuristics. The same tag mode could then always be disabled when untagging, so as to revert to the original tag values.

As another example, the trigger condition may be an update performed in respect of a guard tag associated with a block within the chosen memory region when the same tag mode field is set, and causes a transition from the same tag mode to the default mode. In particular, certain steps can be taken to migrate from the same tag mode to the default mode, so as thereafter to allow the newly specified guard tag value for the identified block to be stored.

Such an approach could be handled explicitly by executing a number of instructions to implement a transition operation which causes at least the same tag mode field in the configuration control information for the chosen memory region to be unset. Those instructions may also for example cause the current memory region guard tag value to be written into each of the individual block guard tags so as to override the previous guard tag values for the blocks, prior to the update of the identified block with the new guard tag value.

Alternatively, rather than executing a number of instructions, an exception may be taken to a higher operating mode of the apparatus in order to emulate the transition operation. The triggering of the exception could arise for a number of reasons. For example, it could be triggered directly when there is an attempt to update a guard tag associated with a block when the corresponding memory region has the same tag mode set.

In one example arrangement, the apparatus further comprises determination circuitry to determine, based on knowledge of address translation factors, whether an update to the configuration control information is allowed to be performed by the apparatus in its current operating mode or whether an exception to a higher operating mode is required to handle a request for the update. The determination circuitry may be provided as part of the memory access circuitry. The address translation factors can take a variety of forms. For example, it may be that the system supports multiple different virtual page sizes, and it may be that at certain lower exception levels, the software is not aware of the minimum page size being used. In that instance, it may be necessary to trap the update procedure to a higher exception level so that the update request can be handled accordingly (to either allow or prevent the update). However, if the minimum page size can be exposed to user space then this may enable some such updates to be performed without trapping to a higher exception level. In particular, if it is determined that the current updates relate to page sizes of the minimum page size, then they may be allowed to be performed at the current exception level, whereas otherwise they can be trapped to a higher exception level where the handling of the update can take place.

As another example, a specific physical page may be mapped into several virtual pages, and in that instance an update operation may only perform an update for the current mapping. For example, if an entry is stored within the TLB for one of the mappings, then the refresh may be performed in respect of that specific mapping, but would not be performed for the other mapping to the same physical page. If the software is aware of the multiple mapping cases, then it can handle them accordingly. However, to support cases of implicit page sharing, where a lower exception level such as EL0 will not be aware of the sharing, it may be preferable for the update operation to be trapped to a higher exception level. In many instances, the presence of implicit page sharing can be implied by some of the attribute bits associated with a page. For example, if implicit page sharing is implemented with a copy-on-write procedure then it is possible that a virtual page will be indicated as not writeable, and in that case the attempt to update the configuration control information could be trapped to a higher exception level.

If desired, an extra field of information can be provided within the configuration control information to identify the special cases that need to be handled in a higher exception level. Accordingly, if the corresponding field is set, then any refresh operation would be trapped to the next exception level. If desired, the system may be configured so as to disallow changing of that field by an unprivileged exception level such as EL0.

Particular examples will now be described with reference to the Figures.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page tables stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
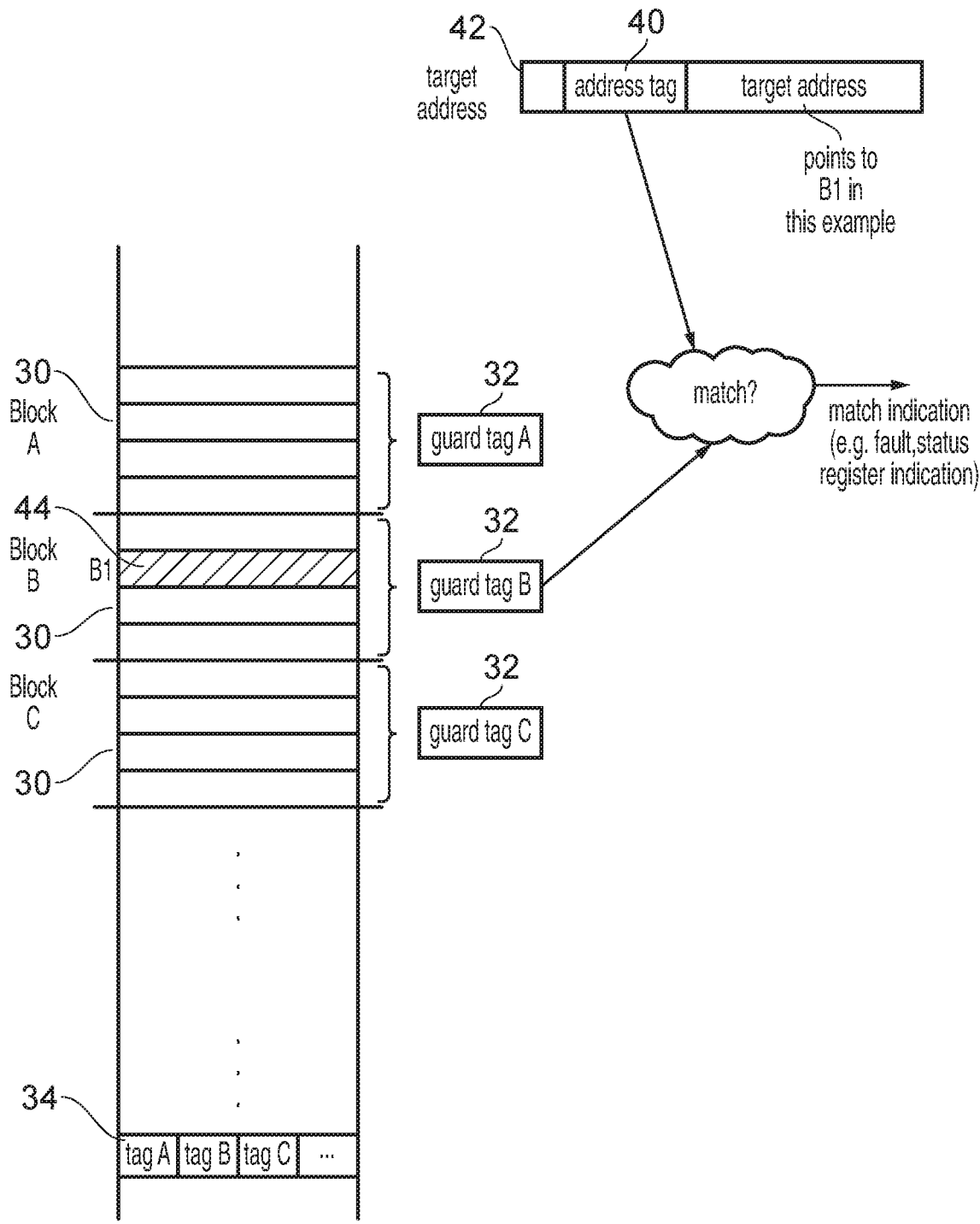
FIG. 2 shows an example of a tag guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18 which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), is compared against the guard tag 32 which is associated with the block of memory locations 30 which includes the addressed location 44. For example, in FIG. 2 the target address 42 points to a certain location B 1 in memory, marked 44 in the address space of FIG. 2. Therefore the guard tag B which is associated with the block of locations B including location B 1 is compared against the address tag 40 associated with a target address 42. As shown in the top of FIG. 2, the address tag 40 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit 15 compares the address tag 40 and the guard tag 32 associated with a block 30 including the addressed location 44, and determines whether they match. The load/store unit 15 generates a match indication indicating whether the address tag 40 and the guard tag 32 matched. For example, this match indication could be a fault signal 60 which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

In accordance with the techniques described herein, configuration control information is provided for each of a plurality of different memory regions, where each memory region comprises multiple of the blocks shown in FIG. 2. The memory regions can take a variety of forms, but in one example arrangement each memory region comprises a memory page, where each memory page will include multiple of the blocks shown in FIG. 2. This is shown schematically in FIG. 3, where the individual blocks referred to in FIG. 2 are referred to in FIG. 3 as granules 100, with each granule having a guard tag associated therewith. As with the earlier described FIG. 2, a memory region 105 may be provided for storing the guard tags.

Figure 3:
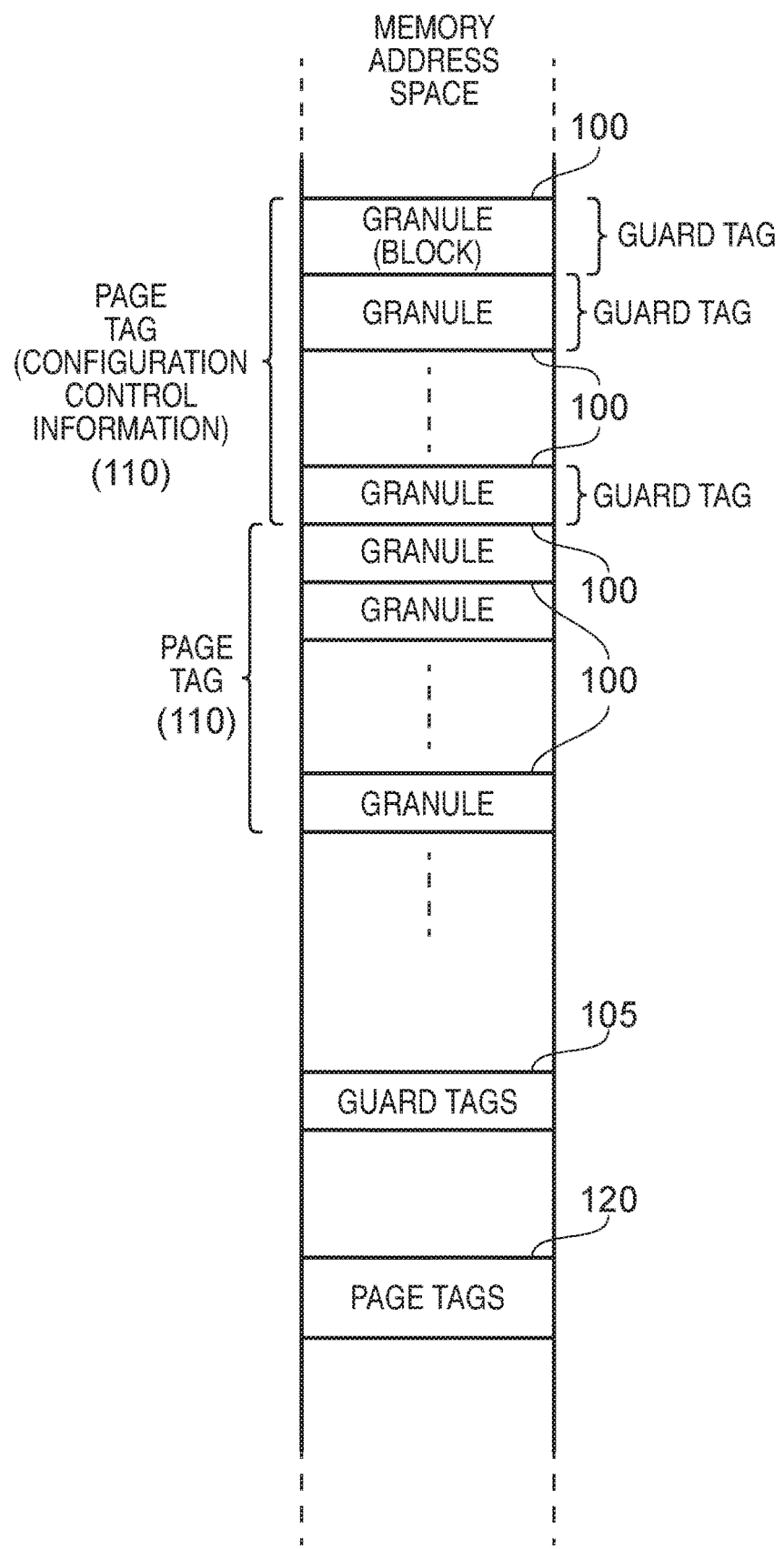
FIG. 3 schematically illustrates memory address space, and the provision of both guard tags and page tags within the memory address space, in accordance with one example arrangement.

However, in addition, as shown in FIG. 3, groups of the granules 100 form corresponding pages in memory, and in association with each page a page tag 110 is provided. For the purposes of the example implementations described herein, each of the memory regions that has associated configuration control information will be assumed to be a page, and accordingly herein the associated configuration control information is referred to as a page tag. A region of memory 120 can be provided for storing the page tags. The earlier discussion as to how the guard tags may be stored in memory applies equally to the page tags 110, and hence these can be stored in architecturally accessible memory locations within a physical address space, or within additional storage locations provided in memory which are not architecturally accessible (not mapped to the same physical address space). The tag cache 19 could in that latter case be extended to also cache page tags, or alternatively a separate caching structure could be provided. In one particular implementation that will be discussed later herein, the page tags are actually cached within entries of the TLB 22, which provides a particularly efficient mechanism for caching the page tag information.

Figure 4:
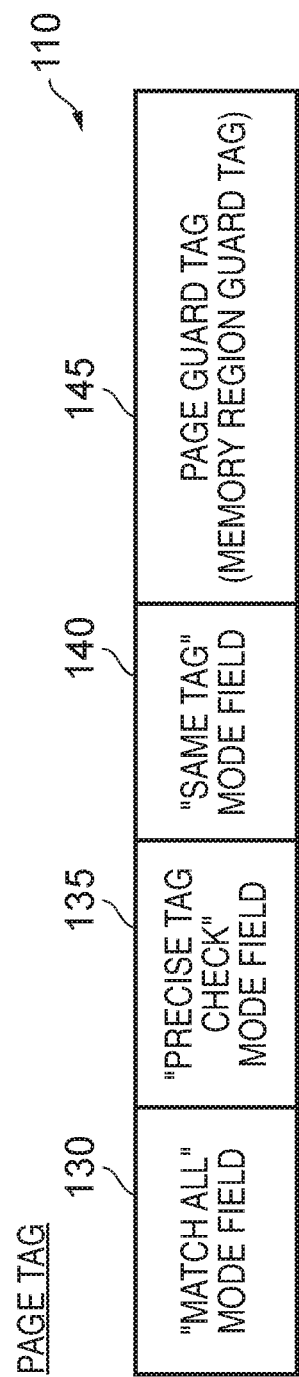
FIG. 4 illustrates a number of fields that may be provided within a page tag in accordance with one example arrangement.

Various forms of configuration control information can be stored within the individual page tags. The information stored therein is used to control how the tag-guarded memory access operation is performed by the load/store unit 15. FIG. 4 illustrates one particular example form of the page tags 110.

As shown in FIG. 4, a number of different fields are provided. In particular, a match all mode field 130 is provided, a precise tag check mode field 135 is provided, a same tag mode field 140 is provided, and in addition a page guard tag field 145 is provided for storing a page guard tag (also referred to herein as a memory region guard tag). The manner in which the tag-guarded memory access operation is controlled in dependence on which of these various fields are set will now be discussed in more detail with reference to FIGS. 5 to 7.

Figure 5:
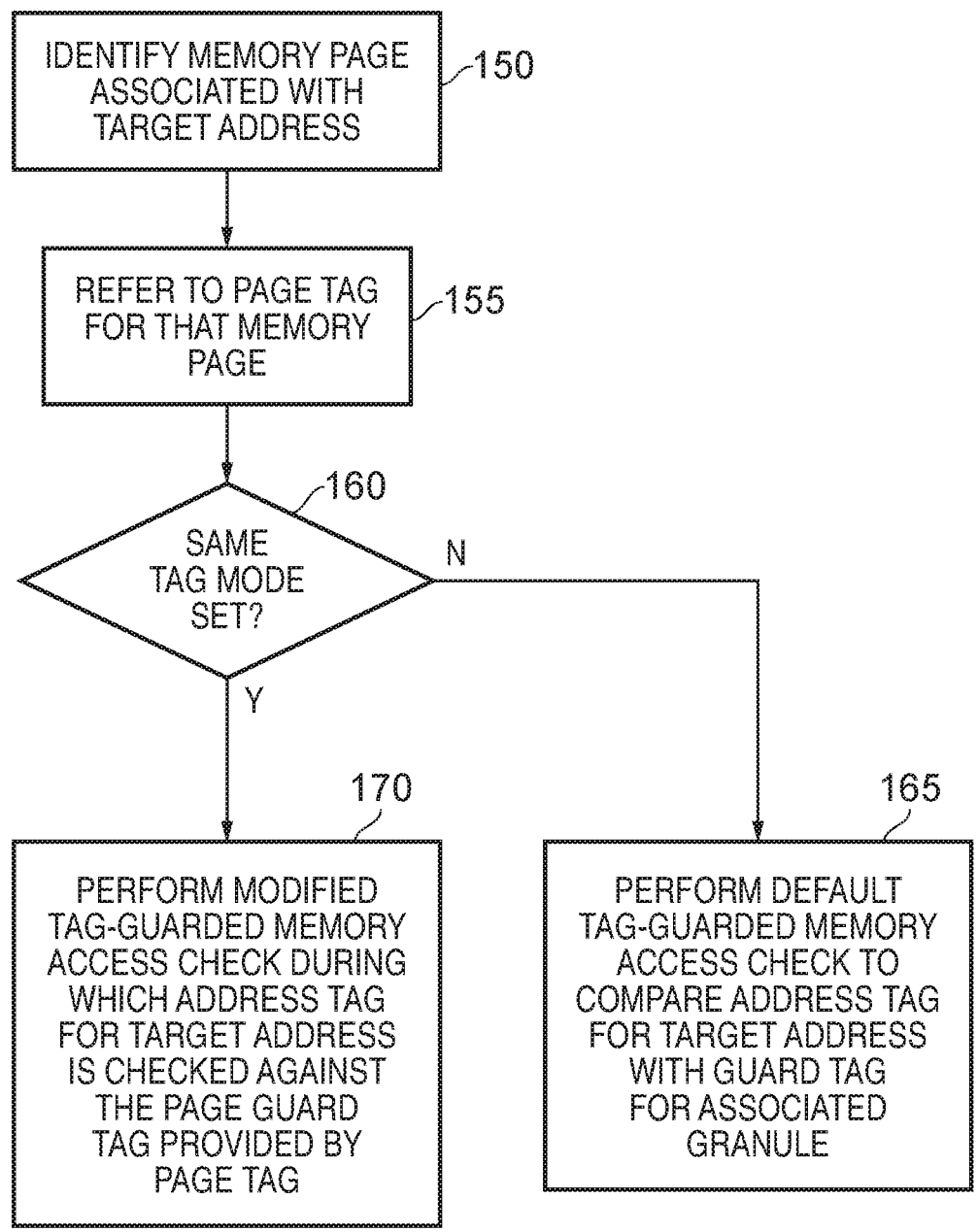
FIG. 5 is a flow diagram illustrating how a tag-guarded memory access operation may be processed dependent on whether a same tag mode is set within the page tag for an associated memory region.

FIG. 5 indicates how the tag-guarded memory access operation may be modified dependent on whether the same tag mode is set within field 140. At step 150, the memory page associated with the target address of the access request is identified, and at step 155 the page tag for that memory page is referenced. This may involve accessing that page tag within a cache structure provided for caching page tags, such as the tag cache 19 or the TLB 22, or retrieving the relevant page tag from memory in the event that it is not cached within the system.

At step 160, it is determined whether the same tag mode is set in that page tag, and if not the process merely proceeds to step 165, where the default tag-guarded memory access check is performed in order to compare the address tag for the target address with the guard tag for the associated granule.

However, if the same tag mode is set, then the process instead proceeds to step 170 where a modified tag-guarded memory access check is performed. In particular, instead of using the guard tag for the associated granule, the page guard tag in the field 145 is used, and accordingly the address tag for the target address is checked against that page guard tag in order to detect whether there is a match or not. The action then taken in dependence on the match is the same as discussed earlier with reference to FIG. 2 when discussing comparisons against the individual guard tags.

Figure 6:
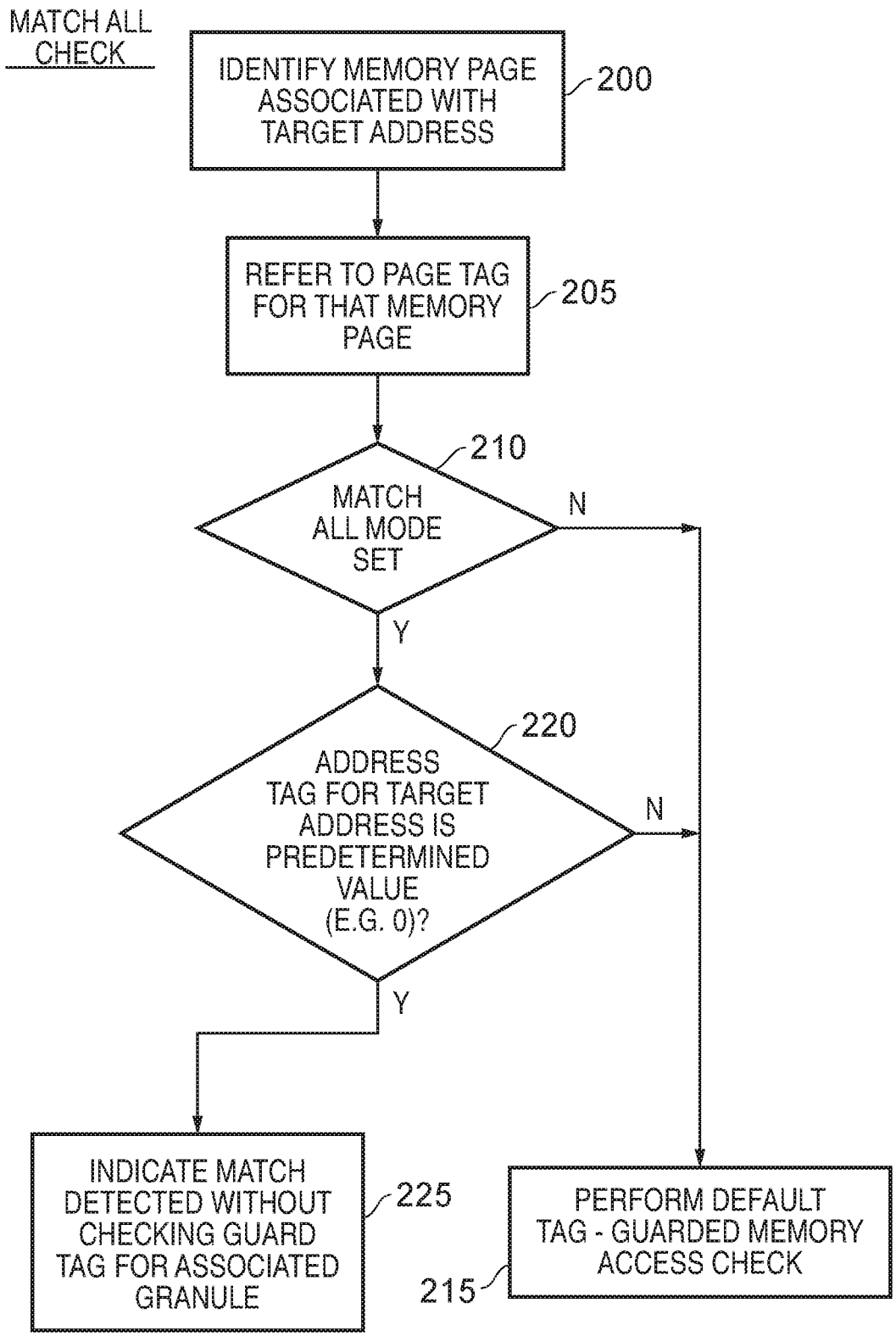
FIG. 6 is a flow diagram illustrating how a tag-guarded memory access operation may be processed dependent on whether a match all mode is set within the page tag for an associated memory region.

FIG. 6 illustrates the steps performed in order to implement the tag-guarded memory access operation dependent on whether the match all mode is set. Steps 200 and 205 correspond to steps 150 and 155 of FIG. 5. At step 210, it is determined whether the match all mode is set in the field 130 of the page tag 110, and if not the process proceeds to step 215 where the default tag-guarded memory access check is performed.

However, if the match all mode is set, then the process proceeds to step 220, where it is determined whether the address tag for the target address has a predetermined value. The predetermined value can take a variety of forms, but in one example arrangement the predetermined value is a zero value for the address tag. If the address tag has a value other than the predetermined value, then the process proceeds to step 215 where the default tag-guarded memory access check is performed. However, if the address tag has the predetermined value, then instead the process proceeds to step 225 where it is indicated that a match has been detected without checking the guard tag for the associated granule.

Figure 7:
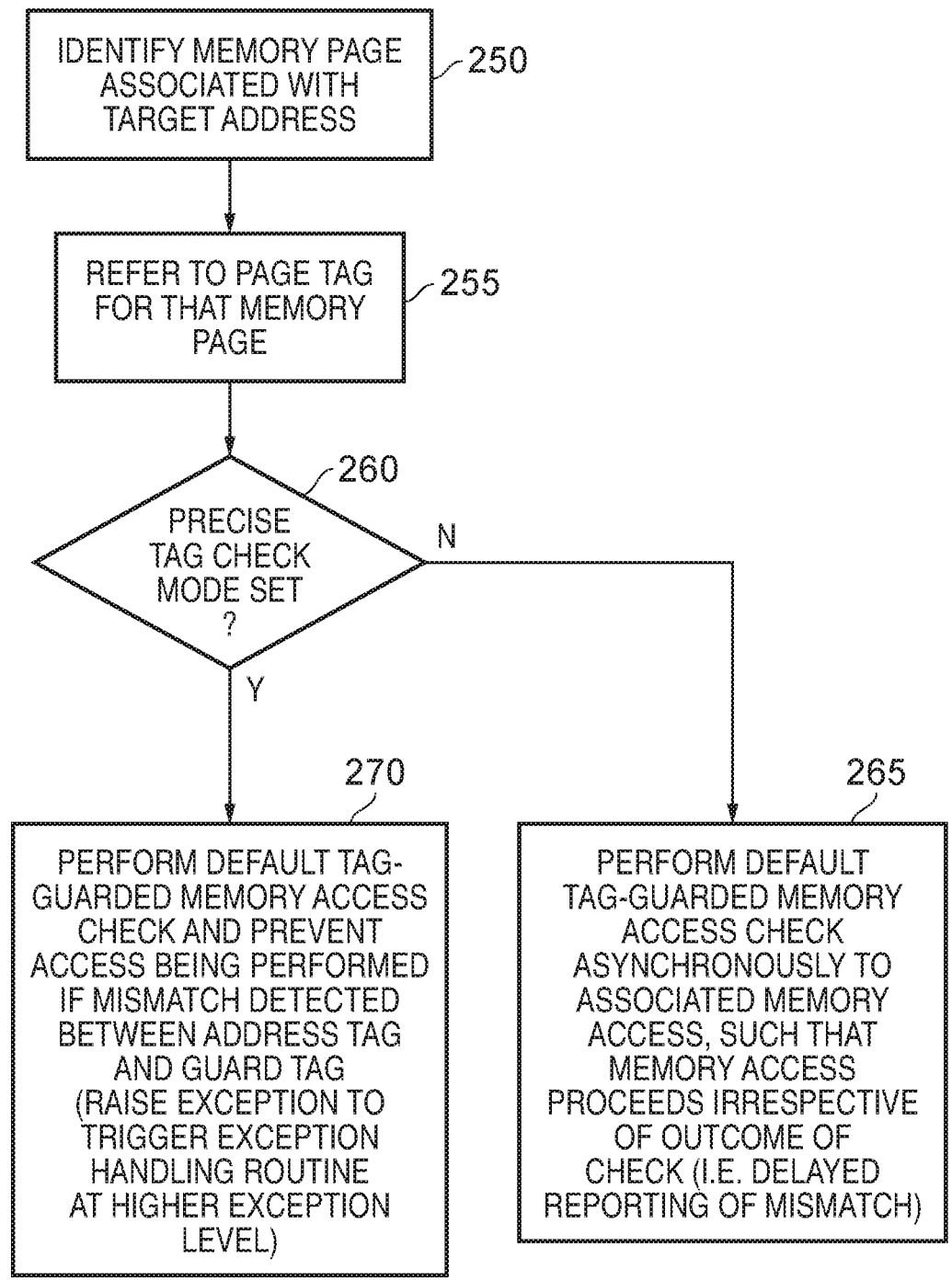
FIG. 7 is a flow diagram illustrating how a tag-guarded memory access operation may be processed dependent on whether a precise tag check mode is set within the page tag for an associated memory region.

FIG. 7 is a flow diagram illustrating how a tag-guarded memory access operation is performed in situations where the precise tag mode is set within the field 135. Steps 250 and 255 correspond to the earlier-discussed steps 150 and 155 of FIG. 5. At step 260, it is determined whether the precise tag check mode is set, and if not the default tag-guarded memory access check is performed asynchronously to the associated memory access at step 265. As a result, this means that the memory access proceeds irrespective of the outcome of the check, and instead there is a delayed reporting of any mismatch. This can be useful in situations where it is merely desired to produce a report of which access operations did not pass the check, but without preventing those accesses taking place. As mentioned earlier, a mismatch indication may be raised separately for each access that fails the tag-guarded memory access check, or alternatively any mismatch indication raised may merely identify that one or more memory accesses have failed, with further investigation then being performed if desired to seek to identify more details.

In contrast however, if the precise tag check mode is set, then the process proceeds to step 270 where the default tag-guarded memory access check is performed, but the memory access is deferred until the outcome of that check is available, such that the access is prevented from being performed if a mismatch is detected between the address tag and the guard tag. Instead of performing the access, then in one example implementation an exception is raised in order to trigger an exception handling routine at a higher exception level. It will be appreciated that the steps taken by the exception handling routine will be dependent on implementation.

Whilst in the above discussion of FIGS. 5 to 7, it is assumed that only one of the mode fields 130, 135, 140 will be set for any particular page tag, this was merely for ease of illustration, and in one implementation the various modes discussed with reference to FIGS. 5 to 7 can be set or unset independently of each other. Hence, by way of example, when considering the match all check process of FIG. 6, if the process proceeds to step 215, but the same tag mode field is set, then step 215 will actually perform a tag-guarded memory access check with reference to the page guard tag in the field 145 rather than the granule guard tag. Also, if the process proceeds to step 225 whilst the same tag mode field is set, then the check against the page guard tag is also skipped, and hence a match is indicated as being detected without checking the address tag with the page guard tag. As another example, if the same tag mode field is set as well as the precise tag check field, then when performing either of steps 265 or 270 of FIG. 7, the page guard tag 145 will again be used instead of the granule's guard tag.

Figure 8:
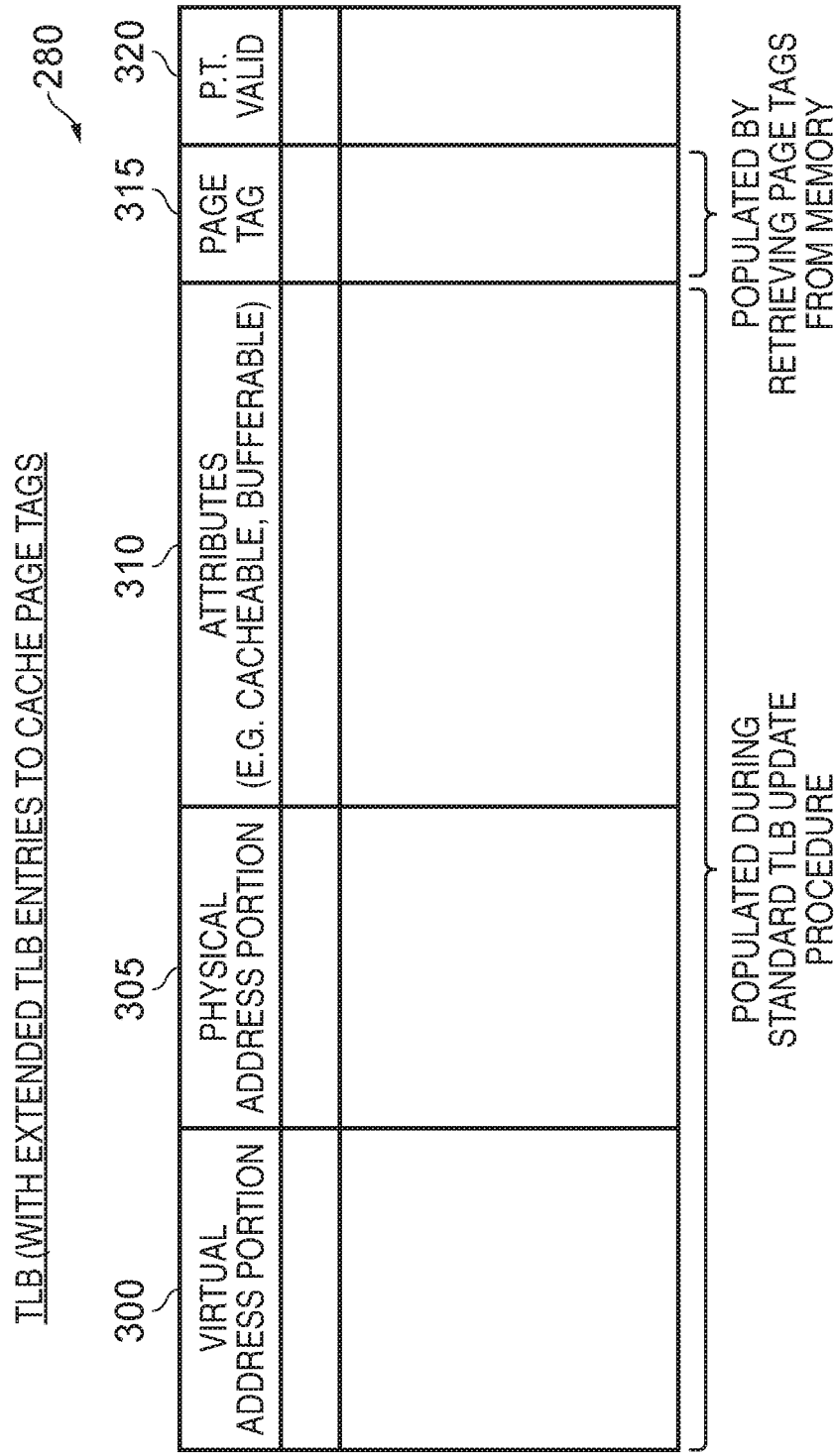
FIG. 8 illustrates how the TLB of FIG. 1 may be extended in order to incorporate page tag values, in accordance with one example arrangement.

As mentioned earlier, in one example implementation the page tags may be cached within the TLB 22 of the MMU 20 shown in FIG. 1. FIG. 8 illustrates on example implementation where the TLB storage structure 280 of the TLB is extended to include additional fields. As shown in FIG. 8, the standard fields 300, 305, 310 are provided for each entry within the TLB. As will be understood by those skilled in the art, the field 300 is used to store a virtual address portion, whilst the field 305 is used to store a corresponding physical address portion, and if it is determined that a particular address indexes into one of the entries in the TLB, then the virtual address can be converted into a physical address using the virtual to physical address mapping indicated by the portions 300, 305. The field 310 is used to store various attributes regarding the memory page associated with the entry, such as whether accesses to that memory page are cacheable, bufferable, etc.

As also shown in FIG. 8, each entry in the TLB storage 280 is extended to include two additional fields. The field 315 is used to store the page tag for the memory page associated with the entry, and a page tag valid field 320 is also provided to identify whether the information held in the page tag field 315 is valid or not.

The fields 300, 305, 310 will be populated using a standard TLB update procedure, typically involving a page table walk process accessing one or more page tables stored in memory in order to retrieve the necessary address translation information. Hereafter, the contents of the fields 300, 305, 310 will collectively be referred to as address translation information. The field 315 will not be populated by the routine page table walk process, but instead a separate access can be performed, for example at the time an entry is initially allocated into the TLB, to retrieve from memory the page tag for the relevant page of memory, with that information being populated within the field 315, and the page tag valid field 320 then being set.

Whilst the above approach may be used in situations where the memory pages associated with the page tags are physical pages, it is also possible in an alternative implementation for the memory pages associated with the page tags to be virtual pages. In that instance, the fields 315, 320 can be populated as a result of the standard page table walk process used to obtain the address translation information, since in such instances the page tag information can be incorporated within the page table information stored in memory, and hence will be retrieved as part of the page table walk process. In some instances, for example in smaller systems where the overall memory address space is relatively small, there may be existing redundant space within the page tables to readily accommodate the page tag information. In such instances, then information can be retained within one of the system control registers 24 shown in FIG. 1 to identify which bits of the address translation information retrieved from the pages tables provide the page tag information.

In one implementation based on virtual addresses, then a separate page tag valid field 320 may not be necessary, since the page tag information is retrieved as part of the standard page table walk process, and hence a general valid flag used for the entire entry can be used to indicate the validity of the address translation data, including the page tag information obtained from the page table walk process.

Figure 9:
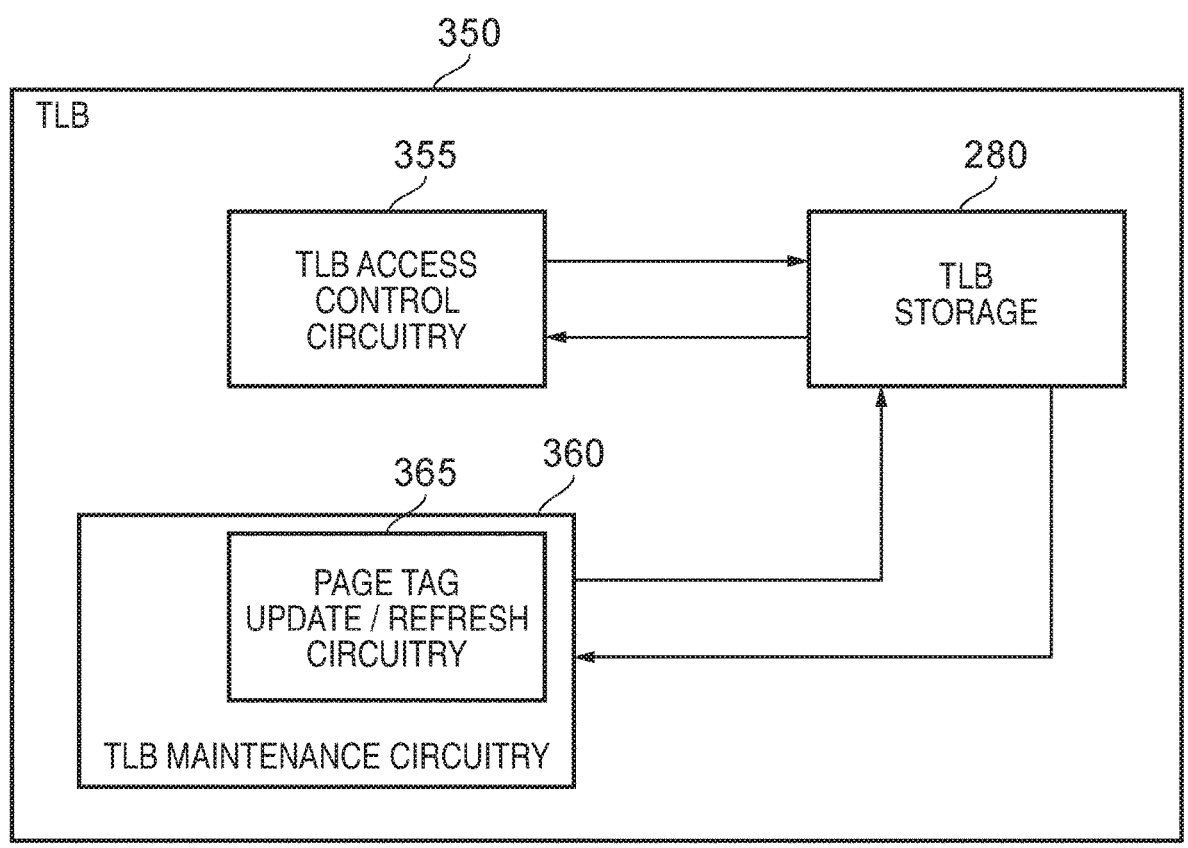
FIG. 9 is a block diagram illustrating components that may be provided within the TLB of FIG. 1 in accordance with one example arrangement.

FIG. 9 is a block diagram illustrating components provided within a TLB 350 in accordance with one example implementation. The TLB 350 includes the TLB storage 280, which can take the form discussed earlier with reference to FIG. 8. TLB access control circuitry 355 is used to perform access operations based on specified virtual addresses, in order to retrieve the address translation information and thereby produce a corresponding physical address for the specified virtual address. As will be discussed later with reference to FIG. 11, the page tag information for the associated memory region can also be provided as an output from the TLB at that point.

Figure 10:
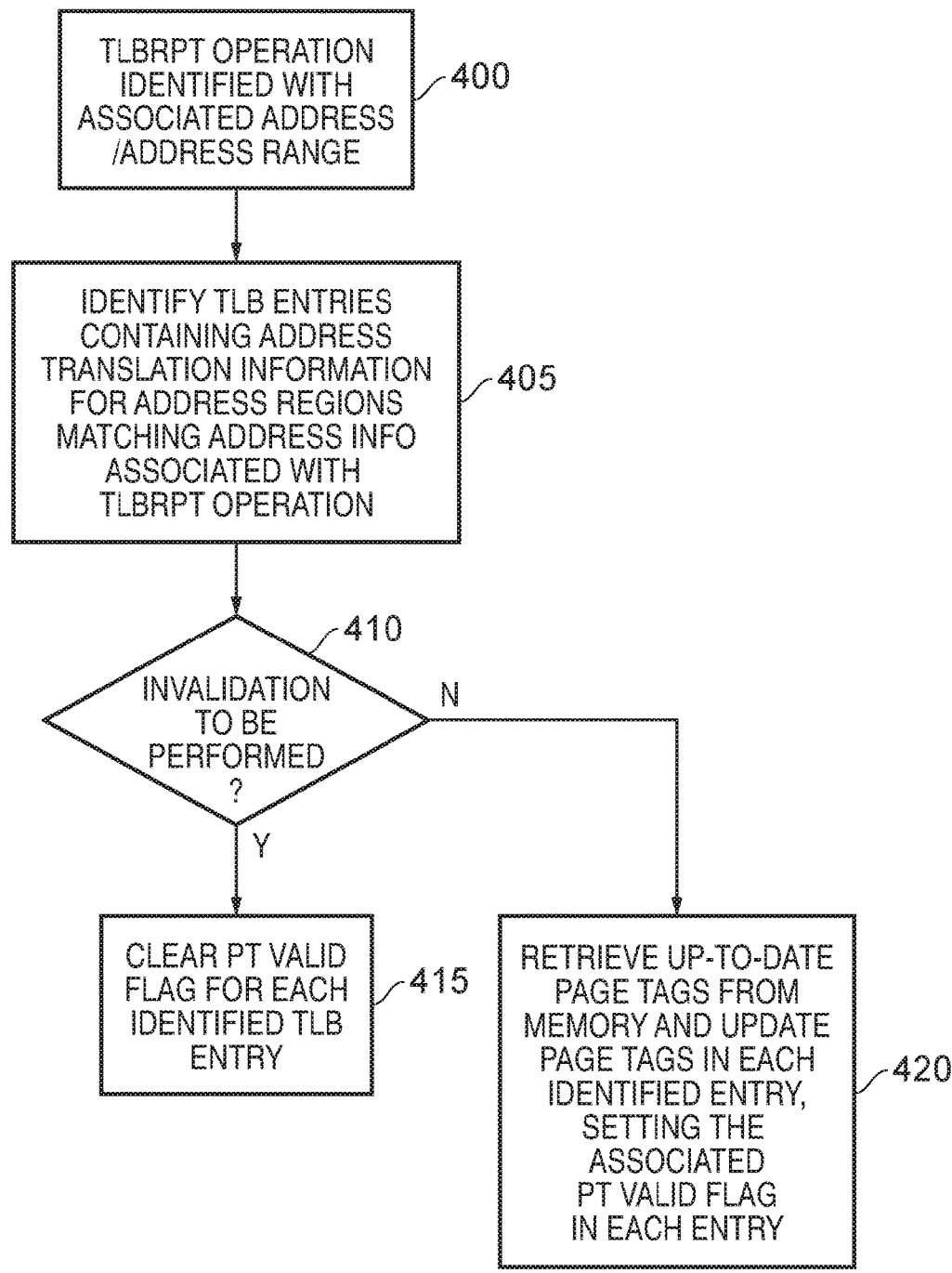
FIG. 10 is a flow diagram illustrating the operation of the page tag update/refresh circuitry of FIG. 9 in one example arrangement.

In addition, TLB maintenance circuitry 360 can be provided for performing TLB maintenance operations on the contents of the TLB storage 280. In addition to standard TLB maintenance operations, the TLB maintenance circuitry 360 may include a page tag update/refresh circuit 365 that is responsive to page tag updates/refresh operations in order to perform a sequence of steps as will be discussed in more detail below with reference to FIG. 10. As shown in FIG. 10, at step 400 a TLB refresh page tags (TLBRPT) operation is identified, having an associated address or address range. The need for a TLBRPT operation can be identified in a variety of ways. For example, an explicit instruction may be provided, referred to herein as a TLBRPT instruction, which provides the address/address range, and when executed causes the refresh operation to be performed. Alternatively, the TLB refresh operation could be triggered automatically by virtue of another operation being performed. For example, an instruction may be provided for storing page tag information to memory, such an instruction being referred to herein as an STPT instruction. When such an instruction is executed in order to update a page tag in memory, then a refresh operation could automatically be invoked in order to seek to refresh any cached copy of the relevant page tag.

Further, whilst the refresh operation may be performed directly in response to execution of an instruction at a particular exception level, in some implementations the refresh operation may only be allowed to be performed at certain higher privileged levels, and accordingly the performance of the refresh operation could be emulated at a higher exception level, rather than performed due to execution of an instruction at a current lower exception level.

If desired, one of the system control registers 24 can be used to provide information identifying at which exception level such a refresh operation can be performed. For example, such information may identify that refresh operations cannot be performed at exception level 0, and any attempt to perform a refresh operation at exception level 0 should be trapped to exception level 1. Alternatively the control information may identify that refresh operations can be performed at exception level 0, or that refresh operations can be performed at exception level 0 for some pages depending on page attributes specified in the relevant page tables in memory. Whichever of the above applies, it is assumed at step 400 that a refresh operation is now being performed, either directly through execution of a suitable instruction, or by emulation at a higher exception level.

At step 405, the TLB entries containing address translation information for an address region matching the address information associated with the TLBRPT operation are identified. The TLBRPT operation may merely identify a single page, in which event at most one TLB entry will need refreshing, or may alternatively identify multiple pages, and hence potentially there may be multiple TLB entries that need to be subjected to the refresh operation.

At step 410, it is determined whether the refresh operation is working in an invalidation mode rather than an update mode. If operating in an invalidation mode, then the process proceeds to step 415, where the page table valid flag 320 is cleared for each identified TLB entry. This hence indicates that the current contents in the page tag field 315 are invalid, and accordingly if in due course there is any need to use the page tag information, it will need to be re-retrieved from memory.

However, if at step 410 it is determined that the update mode is being used, then the process proceeds to step 420 where the process retrieves an up-to-date version of the relevant page tag or page tags from memory and updates the page tag information in each identified TLB entry. For each such entry the PT valid flag is also set.

Figure 11:
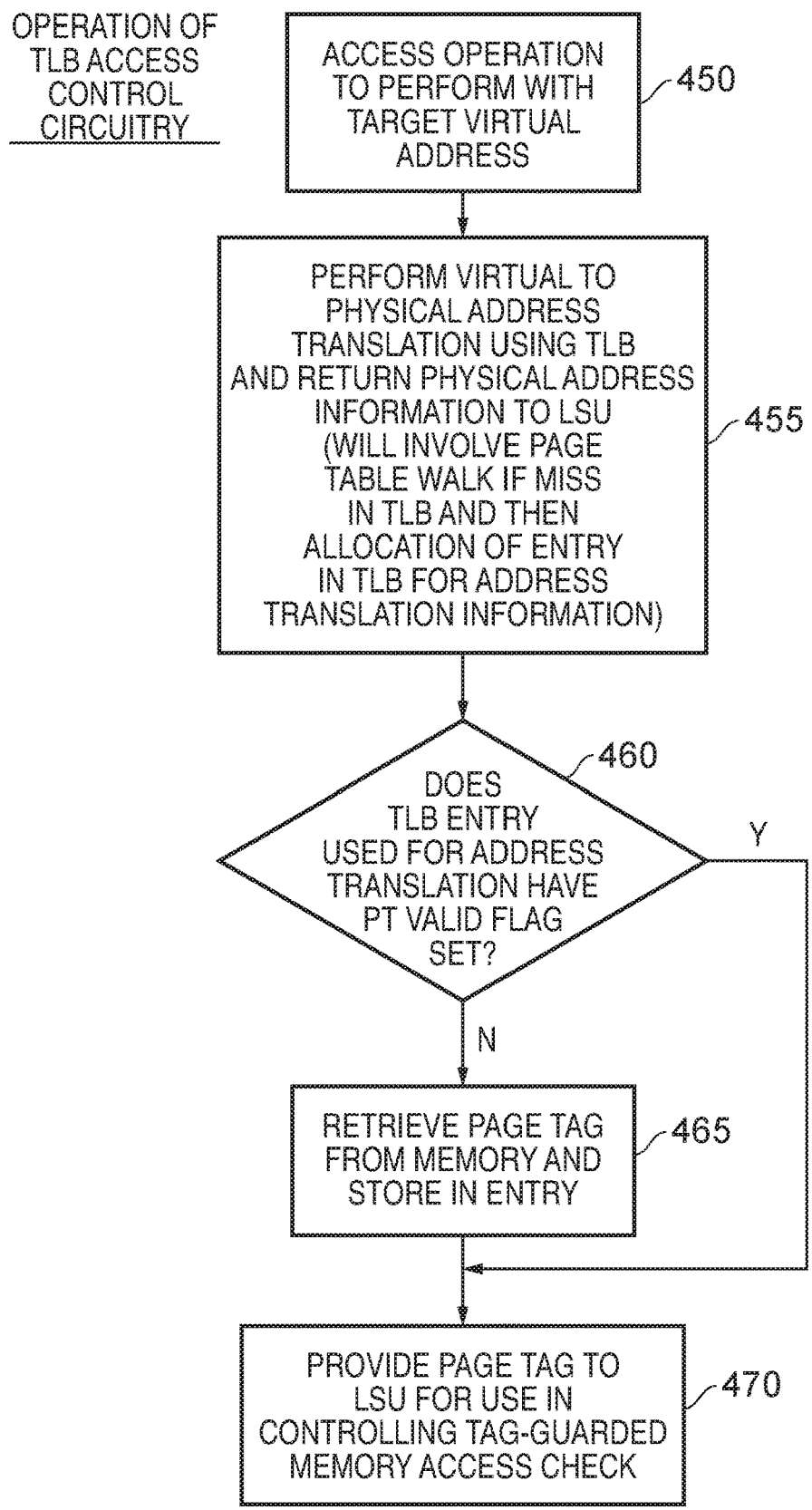
FIG. 11 is a flow diagram illustrating the operation of the tag access control circuitry of FIG. 9 in accordance with one example arrangement.

FIG. 11 is a flow diagram illustrating the operation of the TLB access control circuitry 355 of FIG. 9 in accordance with one example implementation. At step 450, an access operation is identified that is to be performed, that access operation specifying a target virtual address. At step 455, virtual to physical address translation is performed by the TLB access control circuitry 355 using the TLB storage 280. This process will involve performing a page table walk process if a miss in the TLB is detected and then allocating an entry in the TLB for the relevant address translation information. Accordingly, it will be appreciated that by the time step 455 has been performed, an entry will be allocated in the TLB storage, either because it was already there and a hit was detected, or because a miss was detected, causing an entry to be populated within the TLB storage. The physical address determined at step 455 can then be returned to the load/store unit 15.

At step 460, it is determined whether the TLB entry used for the address translation process has the PT valid flag 320 set. This will not be the case if a page table entry has just been populated at step 455 in order to service the access request. Additionally, it will be understood from the earlier discussion that the PT valid flag may not be set if a refresh operation has been performed previously using the invalidation mode of operation, hence proceeding via step 415 of FIG. 10.

If the TLB entry in question does have the PT valid flag set, then the process can merely proceed to step 470, where the page tag held in that entry can be provided to the load/store unit for use in controlling a tag guarded memory access check for the target address of the access operation.

However, if the PT valid flag is not set in the relevant entry, then at step 465 the page tag is retrieved from memory for the relevant page, and then stored in the field 315 of the relevant TLB entry (with the PT valid flag then being set). Thereafter, the process proceeds to step 470.

Figure 12:
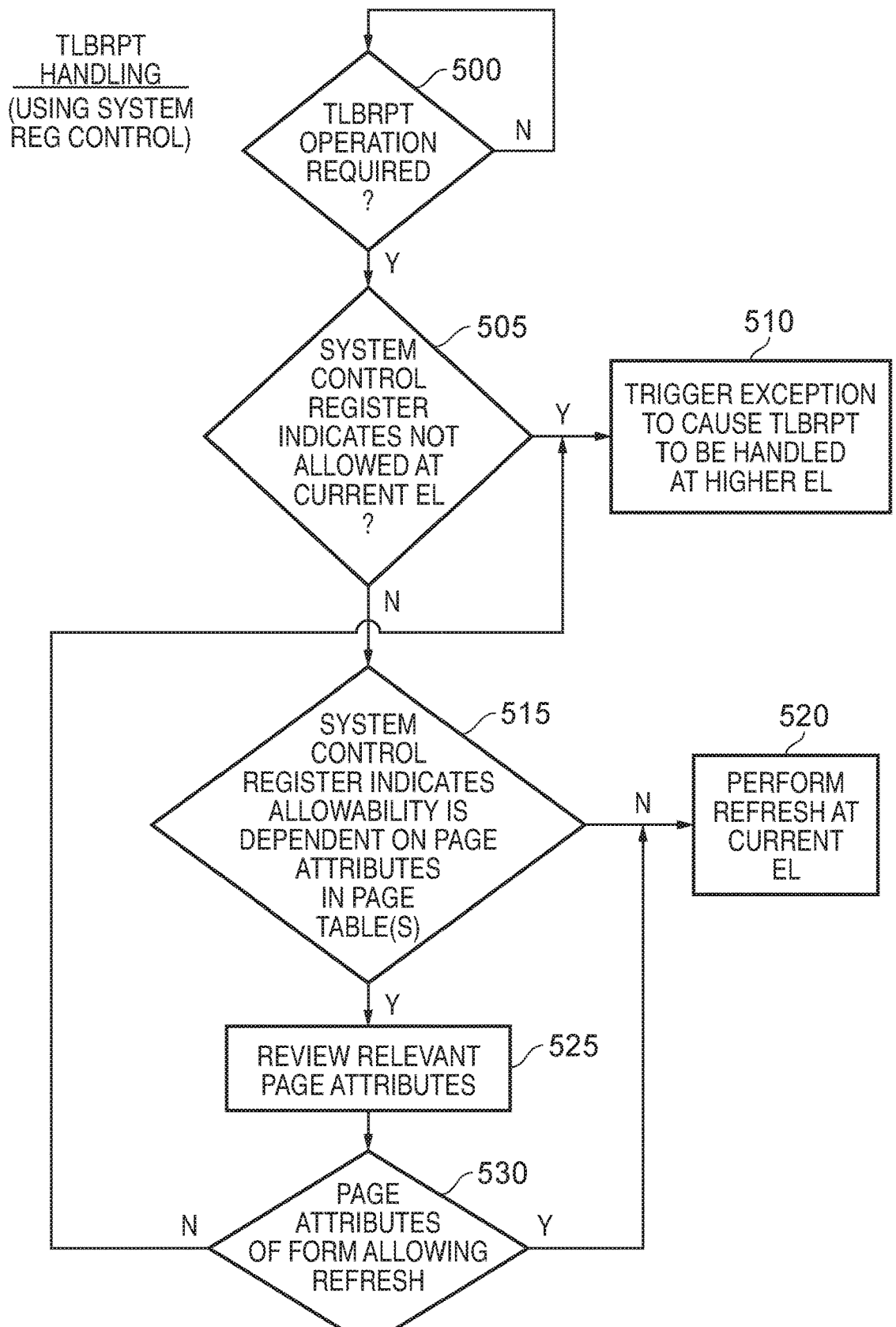
FIG. 12 is a flow diagram illustrating how a TLB refresh operation may be processed dependent on a setting provided within a system control register of the apparatus, in accordance with one example arrangement.

FIG. 12 is a flow diagram illustrating how the TLBRPT handling may be influenced by the information held in the system control registers 24. At step 500, it is determined whether a TLBRPT operation is required. If so, then at step

505 the relevant system control register is reviewed, to determine whether the contents of the that system control register indicates that performance of the TLBRPT operation at the current exception level is not allowed. If that is the case, then at step 510 at exception is triggered to cause the TLBRPT operation to be handled at a higher exception level.

However, if the system control register content does not prevent the TLBRPT operation being performed at the current exception level, then it is checked at step 515 whether the system control register content indicates that the allowability is dependent on page attributes in the page tables. If not, then the refresh operation can be performed at the current exception level at step 520. However, otherwise the relevant page attributes identified by the system control register are reviewed at step 525. This will typically involve accessing the TLB in order to retrieve the attributes that are relevant. Thereafter, at step 530 it is determined whether the page attributes are of a form that allows the refresh operation to be performed at the current exception level. If so the process proceeds to step 520, but otherwise instead proceeds to step 510.

Figure 13A:
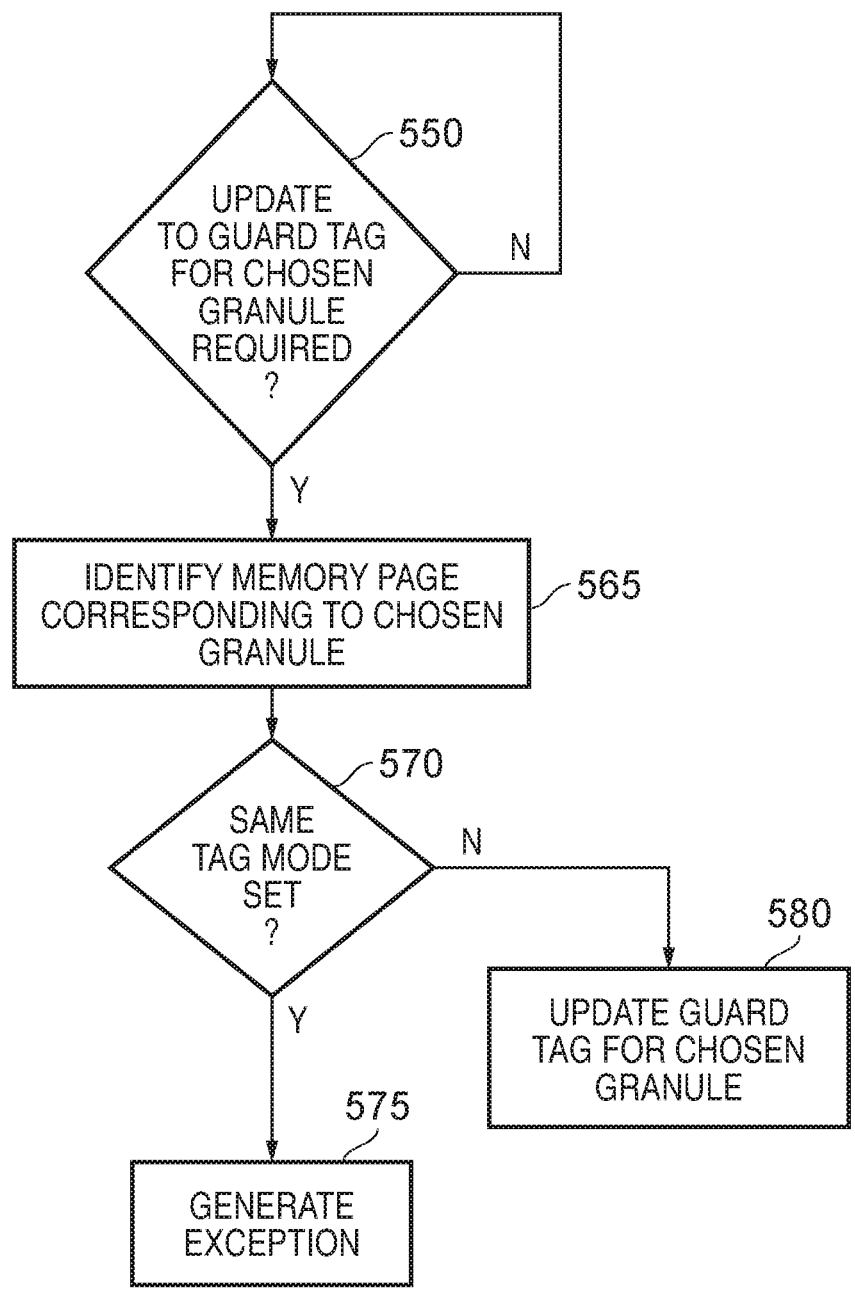
FIG. 13A is a flow diagram illustrating steps that may be taken when seeking to update a guard tag for a chosen granule, in accordance with one example configuration.

In implementations where the earlier-discussed same tag mode is used, then the setting of the same tag mode can be used to additionally control other functionality over and above the earlier-discussed tag-guarded memory access operation. This is illustrated by way of example with reference to FIG. 13A. At step 550, it is determined whether an update to a guard tag for a chosen granule has been requested. This could for example arise due to a store instruction being executed that is seeking to update in memory a particular guard tag. If so, then at step 565 the associated memory page (i.e. the memory page that includes the chosen granule) is identified, and then at step 570 it is determined whether the same tag mode is set for the corresponding page tag. If not, then at step 580 the guard tag can be updated for the chosen granule in the standard manner. However, if the same tag mode is set, then at step 575 an exception may be generated to a higher exception level. At that point an exception handling routine can be executed, the form of that exception handling routine being dependent on implementation.

Figure 13B:
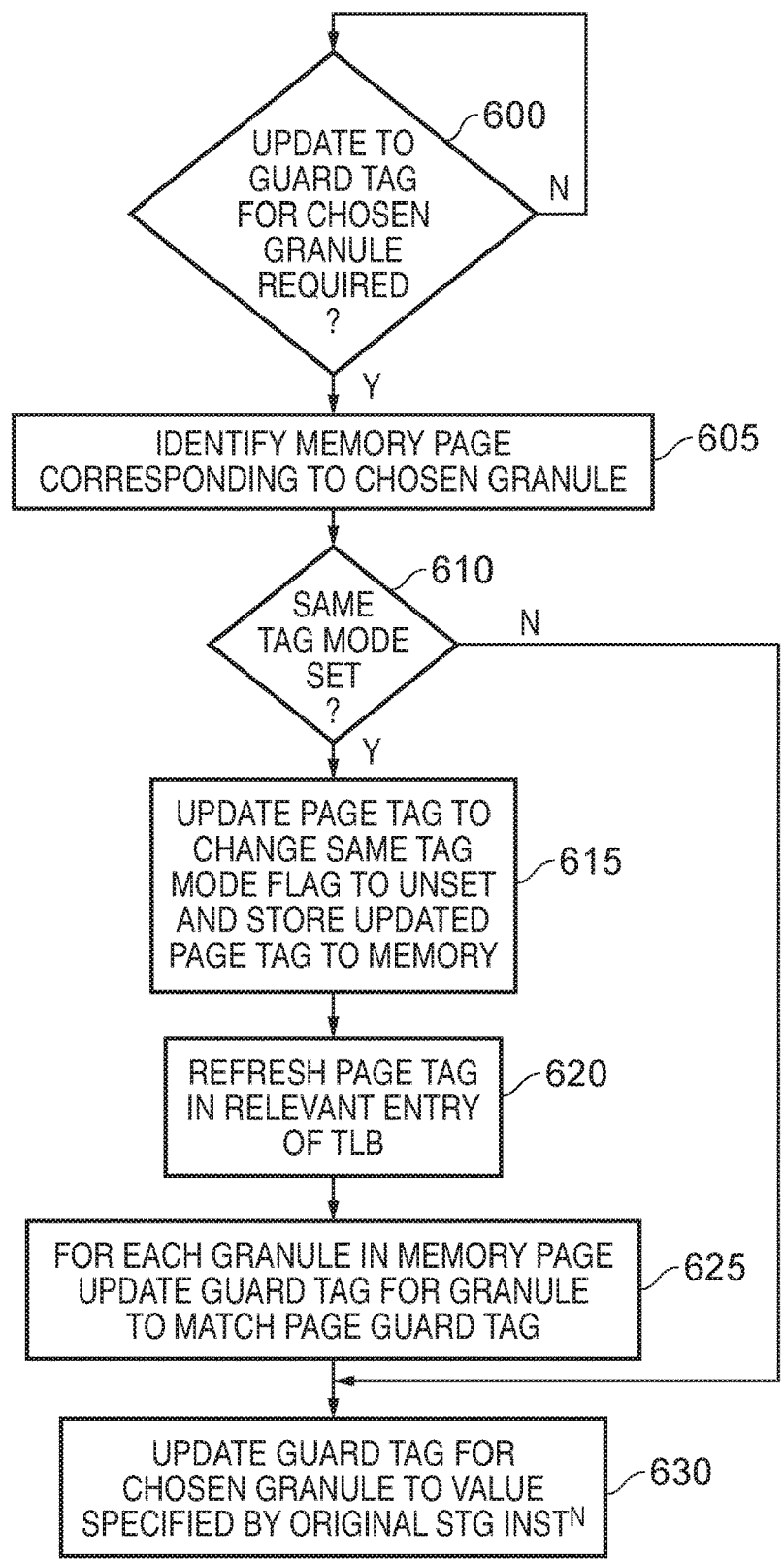
FIG. 13B is a flow diagram illustrating a specific sequence of steps that can be performed when seeking to update a guard tag for a chosen granule, this specific mechanism causing a transition from the same tag mode to a default mode.

FIG. 13B is a flow diagram illustrating a particular example sequence that may be performed when seeking to update a guard tag for a chosen granule. In particular, in accordance with the technique described in FIG. 13B, an attempt to update a guard tag for a particular granule may invoke a mechanism to switch from the same tag mode to a default mode of operation. The steps shown in FIG. 13B can be performed explicitly through execution of a sequence of instructions, or may be performed implicitly, for example by taking an exception on execution of a store granule (STG) instruction so as to emulate the required processing steps at a higher exception level.

When an update to a guard tag for a chosen granule is detected at step 600, then at step 605 the memory page corresponding to the chosen granule is identified, and then at step 610 it is determined whether the same tag mode is set. If not, then the process can proceed directly to step 630, where the guard tag for the chosen granule is updated to the value specified by the update mechanism used at step 600.

However, if the same tag mode is set, then at step 615 the page tag for the relevant memory page is updated so as to change the same tag mode flag to unset rather than set, with the updated page tag then being stored to memory. Thereafter, at step 620, a refresh page tag operation is performed with regard to the relevant entry in the TLB, since it is known that the previous page tag information is now not valid. As will be apparent from the earlier discussion of FIG. 10, this will result in either the page tag valid flag being cleared within the TLB entry, or an up-to-date version of the page tag being retrieved from memory and stored into the TLB, this up-to-date version indicating that the same tag mode is no longer set.

At step 625, for each granule within the memory page, the corresponding guard tag is updated in order to overwrite the previous guard tag information with the page guard tag information within the field 145 of the page tag. As a result, it will be seen that at this point the position is now the same as if the same tag mode had still been set, but instead of an overall page guard tag being used, each of the individual guard tags associated with the granules within the page have been updated to have the same value as the page guard tag.

Thereafter, at step 630 the guard tag for the chosen granule specified by the update mechanism used at step 600 can be updated to the value that was specified by that update mechanism.

As a result it will be understood that the guard tag update has been performed, but a by-product of that process is that the same tag mode is no longer set for the page in question. As a result, a subsequent tag-guarded memory access operation will be performed with reference to the relevant granule guard tag.

Figure 14:
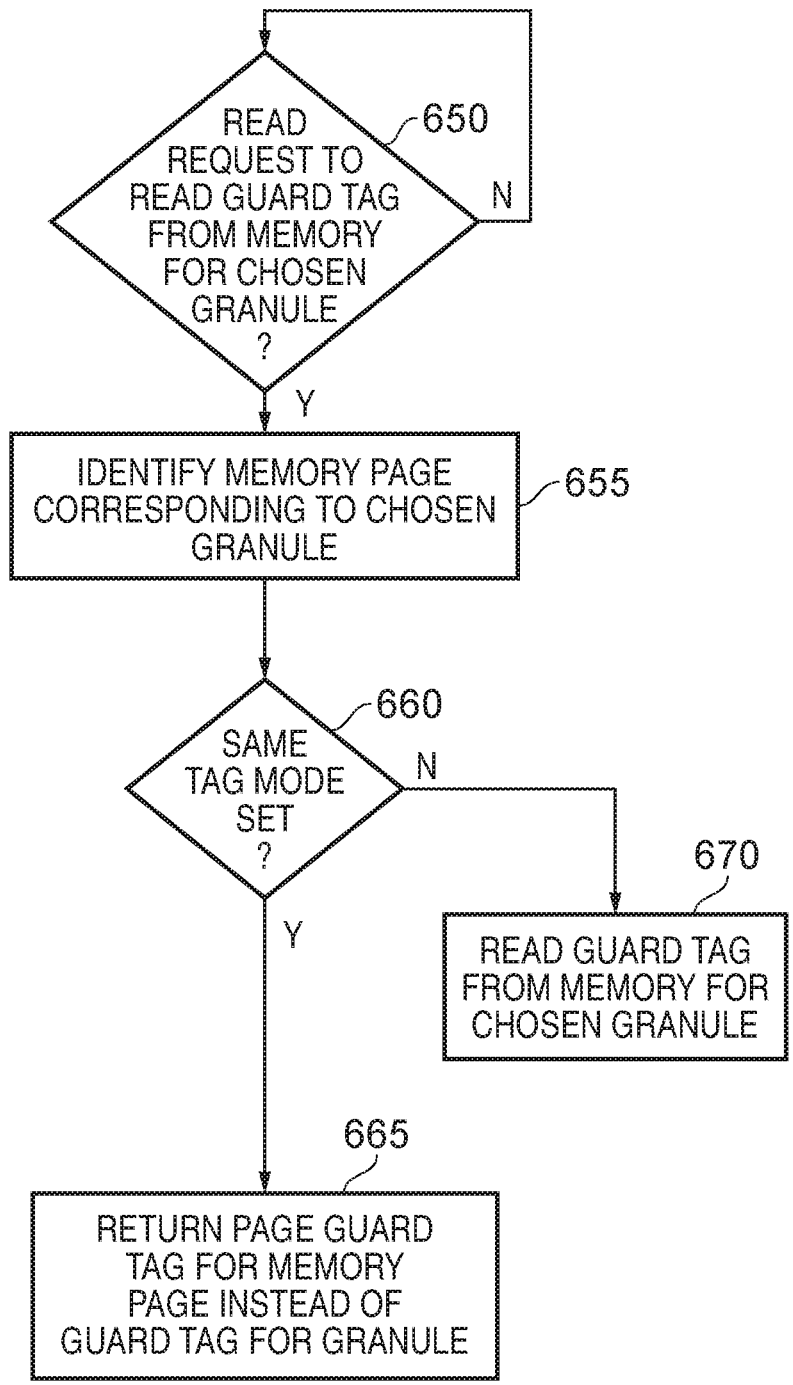
FIG. 14 is a flow diagram illustrating steps that may be performed to process a request seeking to read a guard tag from memory for a chosen granule, in accordance with one example arrangement.

FIG. 14 is a flow diagram illustrating how the presence of the same tag mode being set may influence a read request in respect of a guard tag for a chosen granule. If at step 650 a read request is detected that is seeking to read a guard tag from memory for a chosen granule, then at step 655 the corresponding memory page is identified, i.e. the memory page containing the chosen granule. Thereafter, at step 660, it is determined whether the same tag mode is set within the page tag for that memory page. If not, the process proceeds to step 670 where the guard tag is read from memory for the chosen granule in the usual way.

However, if the same tag mode is set, then the process proceeds to step 665 where instead of reading the guard tag for the chosen granule, the page guard tag is returned for the memory page. Hence, the read request results in the page guard tag being returned rather than the current guard tag contents for the chosen granule.

Figure 15:
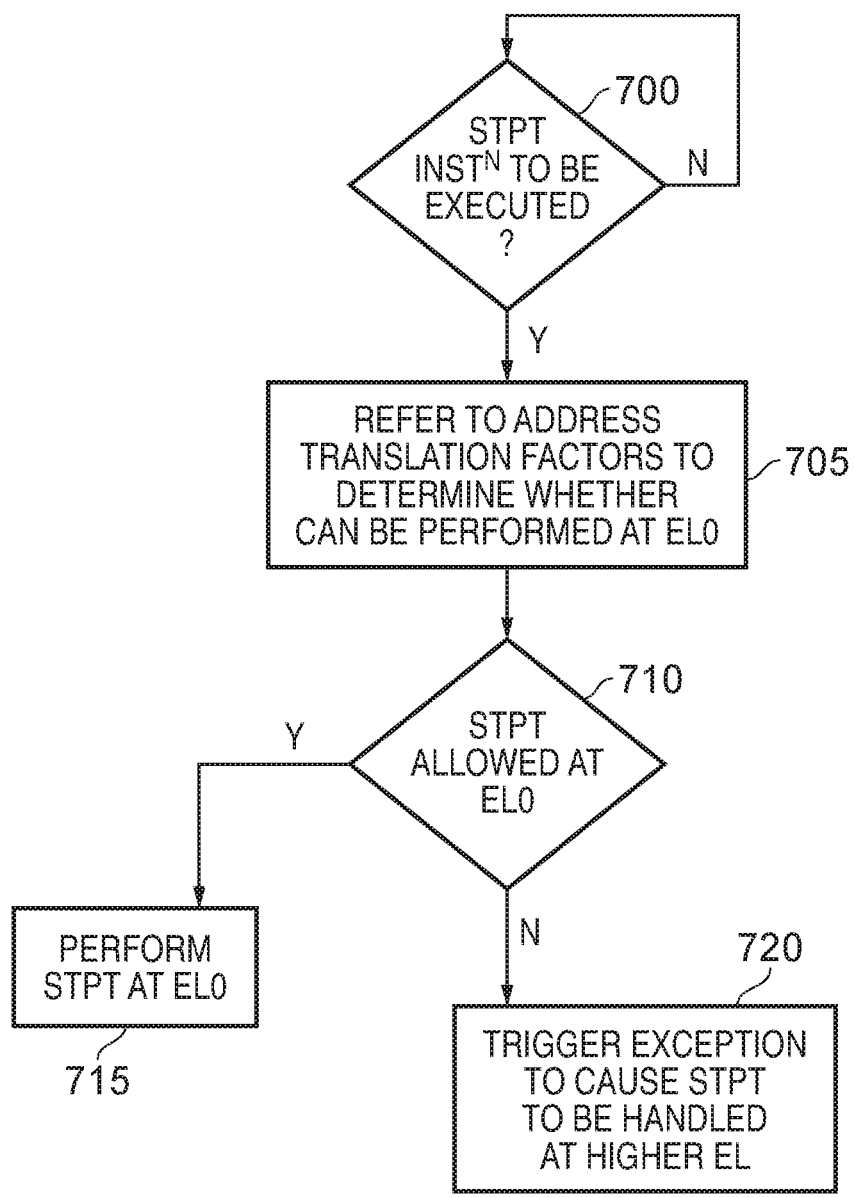
FIG. 15 is a flow diagram illustrating how an operation to store a page guard tag to memory may be processed, in accordance with one example arrangement.

FIG. 15 is a flow diagram illustrating how an STPT instruction may be processed at exception level 0 (EL0) in accordance with one example arrangement. In particular, an STPT instruction is a specific form of store instruction used to update the contents of a page tag. When at step 700 it is determined that such an STPT instruction is to be executed at EL0, then at step 705 reference is made to one or more address translation factors in order to determine whether execution of that STPT instruction can be performed at EL0. As a result, it is determined at step 710 that the STPT instruction can be executed at EL0, then process proceeds to step 715 where the STPT operation is performed. However, otherwise the process proceeds to step 720 where an exception is triggered to cause the STPT operation to be handled at a higher exception level.

There are various examples of address translation factors that could be taken into account at step 705. As one specific example, if the system supports the use of multiple virtual page sizes, and the minimum virtual page size is exposed to exception level 0, then the processing circuitry at exception level 0 can determine whether the STPT operation relates to one or more minimum sized virtual pages. If not, then the STPT operation will not be performed at exception level 0, and instead will be trapped to exception level 1.

As another example, an implicit page sharing mechanism may be used in situations where a specific physical page may be mapped into several virtual pages, and hence different virtual addresses may map to the same physical address. In situations where this will be transparent to the processing circuitry executing at exception level 0, and hence there is implicit page sharing, then an additional bit may be provided within the page tag information which, when set to indicate such a situation, causes any attempt to perform an STPT operation in association with the corresponding page to be trapped to exception level 1.

Figure 16:
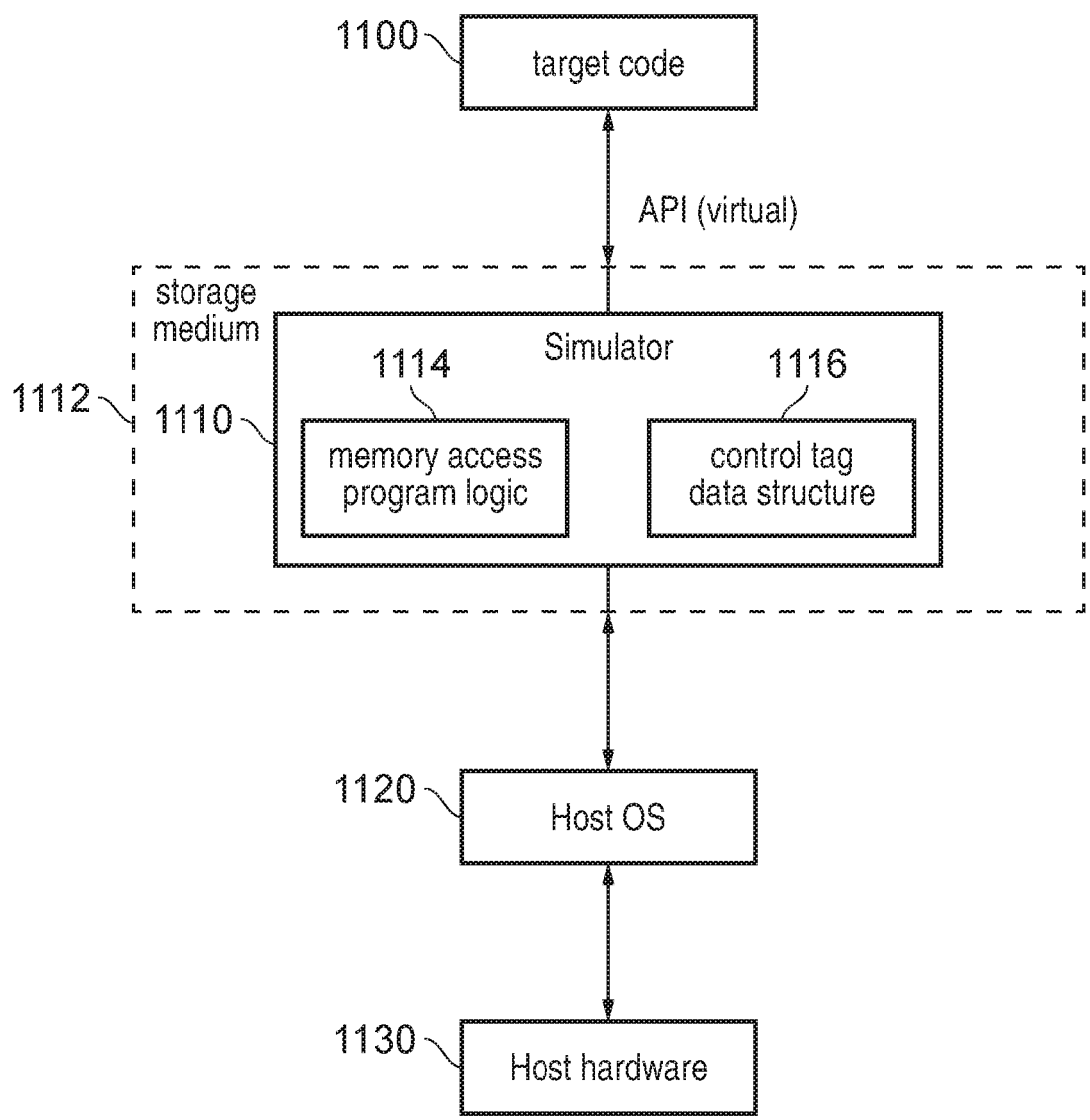
FIG. 16 shows an example of a simulator supporting the techniques described herein.

FIG. 16 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1130, optionally running a host operating system 1120, supporting the simulator program 1110. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1130), some simulated embodiments may make use of the host hardware, where suitable.

The simulator program 1110 may be stored on a computer-readable storage medium 1112 (which may be a non-transitory medium), and provides a program interface (instruction execution environment) to the target code 1100 (which may include applications, operating systems and a hypervisor) which is the same as the application program interface of the hardware architecture being modelled by the simulator program 1110. Thus, the program instructions of the target code 1100 may be executed from within the instruction execution environment using the simulator program 1110, so that a host computer 1130 which does not actually have the hardware features of the apparatus 2 discussed above can emulate these features. For example, the simulator program 1110 may include memory access program logic 1114 for controlling access to memory by instructions of the target code 1100. For example, the memory access program logic 1114 may include instructions for performing the comparison of the guard tag and the address tag and reporting whether any mismatch between the guard tag and address tag has been detected. Also, the simulator program 1110 may include a control tag data structure 1116 to store, for each of a plurality of memory regions, configuration control information used to control how the tag-guarded memory access operation is performed when the target address is within that memory region.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
memory access circuitry to perform a tag-guarded memory access operation in response to a target address, the tag-guarded memory access operation by default comprising:
comparing an address tag associated with the target address with a guard tag stored in a memory system in association with a block of one or more memory locations comprising an addressed location identified by the target address; and
generating an indication of whether a match is detected between the guard tag and the address tag; and
control tag storage to store, for each of a plurality of memory regions, configuration control information used to control how the tag-guarded memory access operation is performed by the memory access circuitry when the target address is within that memory region, each memory region corresponding to multiple of the blocks, wherein
the configuration control information comprises a precise tag check mode field; and
the memory access circuitry is arranged, when the addressed location identified by the target address is within a memory region whose precise tag check mode field is set, to perform the tag-guarded memory access operation such that when a mismatch is detected between the guard tag and the address tag the memory access circuitry is arranged to prevent a memory access to the addressed location being performed; and the memory access circuitry is arranged, when the addressed location identified by the target address is within a memory region whose precise tag mode field is unset, to perform the tag-guarded memory access operation such that when a mismatch is detected between the guard tag and the address tag the memory access circuitry is arranged to allow the memory access to the addressed location to be performed asynchronously to any mismatch indication raised in respect of the mismatch.

2. An apparatus as claimed in claim 1, wherein each memory region comprises one or more memory pages.

3. An apparatus as claimed in claim 2, wherein each memory region comprises a single memory page.

4. An apparatus as claimed in claim 2, wherein the one or more memory pages are one of:
physical memory pages;
virtual memory pages.

5. An apparatus as claimed in claim 4, wherein the memory pages are virtual memory pages, and the configuration control information is determined from address translation information held in page tables in the memory system.

6. An apparatus as claimed in claim 5, wherein a system register is used to identify which bits of the address translation information provide the configuration control information.

7. An apparatus as claimed in claim 1, wherein:
the configuration control information comprises a same tag mode field and a memory region guard tag; and
the memory access circuitry is arranged, when the addressed location identified by the target address is within a memory region whose same tag mode field is set, to modify the tag-guarded memory access operation such that the address tag is compared with the memory region guard tag for that memory region instead of with the guard tag associated with the block containing the addressed location.

8. An apparatus as claimed in claim 7, wherein the memory access circuitry is responsive to a request to access a guard tag associated with a chosen block, to take an alternative action when the same tag mode field is set for the memory region associated with that chosen block.

9. An apparatus as claimed in claim 7, wherein the apparatus is arranged, for a chosen memory region, to switch between a default mode where the same tag mode field for that chosen memory region is unset and a same tag mode where the same tag mode field for that chosen memory region is set, depending on a trigger condition.

10. An apparatus as claimed in claim 9, wherein the trigger condition is an update performed in respect of a guard tag associated with a block within the chosen memory region when the same tag mode field is set, and causes a transition from the same tag mode to the default mode.

11. An apparatus as claimed in claim 10, wherein the transition is handled by one of:
executing a number of instructions to implement a transition operation which causes at least the same tag mode field in the configuration control information for the chosen memory region to be unset;
taking an exception to a higher operating mode of the apparatus to emulate the transition operation.

12. An apparatus as claimed in claim 1, wherein:
the configuration control information comprises a match all mode field; and the memory access circuitry is arranged, when the addressed location identified by the target address is within a memory region whose match all mode field is set, to modify the tag-guarded memory access operation such that when the address tag has a predetermined value, the comparison of the address tag with the guard tag is bypassed, and the generating step comprises generating an indication that a match is detected between the guard tag and the address tag.

13. An apparatus as claimed in claim 1, wherein the control tag storage includes a cache structure.

14. An apparatus as claimed in claim 13, wherein each memory region comprises one or more memory pages, the control tag storage is provided by a translation lookaside buffer (TLB) having a plurality of entries, each entry maintaining address translation information for a memory page and including a field used to identify the configuration control information for that memory page.

15. An apparatus as claimed in claim 1, wherein the configuration control information for each memory region is maintained within a memory area of the memory system, and apparatus further comprises:
an instruction decoder to decode configuration control information access instructions to control the memory access circuitry to load the configuration control information for a determined memory region from the memory area, and to store updated configuration control information for a determined memory region to the memory area.

16. An apparatus as claimed in claim 15, wherein the memory area is a dedicated area of the memory system accessible using the configuration control information access instructions.

17. An apparatus as claimed in claim 1, further comprising control tag storage update circuitry responsive to a trigger to perform a refresh operation in respect of the configuration control information stored in the control tag storage.

18. An apparatus as claimed in claim 17, wherein the trigger occurs upon execution of a refresh instruction by the apparatus, the refresh instruction providing an address indication used to identify one or more memory regions whose configuration control information is to be subjected to the refresh operation.

19. An apparatus as claimed in claim 18, wherein:
the control tag storage includes a cache structure;
each memory region comprises one or more memory pages, the control tag storage is provided by a translation lookaside buffer (TLB) having a plurality of entries, each entry maintaining address translation information for a memory page and including a field used to identify the configuration control information for that memory page; and
the refresh instruction is a TLB refresh configuration control information instruction, which on execution causes a maintenance operation to be performed within the TLB in order to identify which entries within the TLB provide configuration control information for a memory page identified by the address indication of the TLB refresh configuration control information instruction, and to perform a refresh action in respect of the configuration control information in each identified entry.

20. An apparatus as claimed in claim 19, wherein the refresh action comprises one of:
invalidating the configuration control information as stored in the entry;

updating the configuration control information as stored in the entry by retrieving an up-to-date version of that configuration control information from the memory system.

21. An apparatus as claimed in claim 12, wherein the trigger occurs upon execution of a store instruction used to store updated configuration control information for a determined memory region to the memory system.

22. An apparatus as claimed in claim 12, further comprising a system control register to control which operating modes of the apparatus are enabled to perform the refresh operation.

23. An apparatus as claimed in claim 22, wherein the system control register identifies an extent to which the refresh operation is allowed to be performed whilst the apparatus is operating at an application level.

24. An apparatus as claimed in claim 23, wherein the system control register is set so as to seek to prevent, at the application level, denial of service attacks attempted using the refresh operation.

25. An apparatus as claimed in claim 1, further comprising determination circuitry to determine, based on knowledge of address translation factors, whether an update to the configuration control information is allowed to be performed by the apparatus in its current operating mode or whether an exception to a higher operating mode is required to handle a request for the update.

26. A method of controlling memory accesses comprising:
performing a tag-guarded memory access operation in response to a target address, the tag-guarded memory access operation by default comprising:
comparing an address tag associated with the target address with a guard tag stored in a memory system in association with a block of one or more memory locations comprising an addressed location identified by the target address; and
generating an indication of whether a match is detected between the guard tag and the address tag;
storing, for each of a plurality of memory regions, configuration control information; and
using the configuration control information to control how the tag-guarded memory access operation is performed by the memory access circuitry when the target address is within that memory region, each memory region corresponding to at least one of the blocks, wherein
the configuration control information comprises a precise tag check mode field; and
when the addressed location identified by the target address is within a memory region whose precise tag check mode field is set, the tag-guarded memory access operation is performed such that when a mismatch is detected between the guard tag and the address tag, a memory access to the addressed location is prevented; and
when the addressed location identified by the target address is within a memory region whose precise tag mode field is unset, the tag-guarded memory access operation is performed such that when a mismatch is detected between the guard tag and the address tag, the memory access to the addressed location is allowed to be performed asynchronously to any mismatch indication raised in respect of the mismatch.

27. A non-transitory, computer-readable storage medium storing a computer program, which when executed by a host data processing apparatus, controls the host data processing apparatus to provide an instruction execution environment for execution of instructions of target program code, comprising:
memory access program logic to perform a tag-guarded memory access operation in response to a target address, the tag-guarded memory access operation by default comprising:
comparing an address tag associated with the target address with a guard tag stored in a memory system in association with a block of one or more memory locations comprising an addressed location identified by the target address; and
generating an indication of whether a match is detected between the guard tag and the address tag; and
a control tag data structure to store, for each of a plurality of memory regions, configuration control information used to control how the tag-guarded memory access operation is performed by the memory access program logic when the target address is within that memory region, each memory region corresponding to at least one of the blocks, wherein
the configuration control information comprises a precise tag check mode field; and
the memory access program logic is arranged, when the addressed location identified by the target address is within a memory region whose precise tag check mode field is set, to perform the tag-guarded memory access operation such that when a mismatch is detected between the guard tag and the address tag the memory access program logic is arranged to prevent a memory access to the addressed location being performed; and
the memory access program logic is arranged, when the addressed location identified by the target address is within a memory region whose precise tag mode field is unset, to perform the tag-guarded memory access operation such that when a mismatch is detected between the guard tag and the address tag the memory access program logic is arranged to allow the memory access to the addressed location to be performed asynchronously to any mismatch indication raised in respect of the mismatch.

* * * * *